US006199047B1

(12) United States Patent
Dimino et al.

(10) Patent No.: US 6,199,047 B1
(45) Date of Patent: *Mar. 6, 2001

(54) APPARATUS AND METHOD FOR AN EVENT RATING ENGINE

(75) Inventors: James Dimino, Arvad; Mitchell W. Smith, Boulder; David Bones, Boulder; Brigham Bell, Boulder, all of CO (US)

(73) Assignee: CSG Systems, Inc., Englewood, CO (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/001,991

(22) Filed: Dec. 31, 1997

(51) Int. Cl.[7] .................................................. C06F 13/00
(52) U.S. Cl. ........................................ 705/10; 379/114
(58) Field of Search ............................. 705/10, 32, 412, 705/400, 401, 402, 409; 702/186, 187, 188, 179, 180, 181; 364/528.26, 828.3; 379/114, 112, 207

(56) References Cited

U.S. PATENT DOCUMENTS 4,791,665 * 12/1988 Bogart et al. ......................... 379/207
5,420,914 * 5/1995 Blumhardt ............................ 379/114
5,425,085 * 6/1995 Weinberger et al. ................. 379/112
5,799,072 * 8/1998 Vulcan et al. ........................ 379/114
6,078,889 * 6/2000 Boucher et al. .......................... 705/1

FOREIGN PATENT DOCUMENTS

WO 97/22936 * 6/1997 (CA) .............................. G06F/13/00

OTHER PUBLICATIONS

Free long distance—almost. "LAN Times" vol. 14, No. 24, p. 21 (Nov. 24, 1997) pp. 1–2.*

* cited by examiner

Primary Examiner—James P. Trammell
Assistant Examiner—John Leonard Young
(74) Attorney, Agent, or Firm—Baker & McKenzie

(57) ABSTRACT

An event rating engine can be configured for a particular task and is logically decoupled from a rating database when a usage event is rated. The rating engine obtains rating rules from a rating database. The rating database includes rating rules that include rating business rules by usage type along with rate tables containing the current rate values. A rating domain server is coupled to the rating database interface to the rating rules. A rating editor coupled to the rating domain server and provides an interface to the rating domain server. At initialization, the rating engine downloads a set of rating rules from the rating database and interprets the rating rules to form an independent and autonomous rating process that can rate a usage event while being logically decoupled from the rating database during the rating process.

17 Claims, 19 Drawing Sheets

FIG. 4

| TIME PERIOD GROUP | ACCT TYPE | RATE GROUP | RATEABLE COMP. | BASE RATE | RATING SCHEME | COEFF | THRESHOLD | UNITS OF MEAS. | RD. METH | RD. TO | RD. PT. |
|---|---|---|---|---|---|---|---|---|---|---|---|
| 1 | | | | | | | | | | | |
| 2 | | | | | | | | | | | |
| 3 | | | | | | | | | | | |
| 4 | | | | | | | | | | | |
| 5 | | | | | | | | | | | |
| ... | | | | | | | | | | | |
| n | | | | | | | | | | | |

FIG. 6

| Variable | Input/Output | Variable Identifier | Type | Description | Usage Type Required |
|---|---|---|---|---|---|
| accountType | Input | 00001 | Symbol | The name of the account type that the Rating Engine will use when looking up rates affected by account types. | Optional |
| accumulatedPriorQuality | Input | 00002 | Integer | The quantity of units previously accumulated. | Optional |
| accumulatedQuantity | Output | 00003 | Integer | The quantity of units accumulated in rating. | Optional |
| accumulateOrRateAmount | Input | 00004 | Symbol | Indicator used to accumulate the results into quantity or rate the results into an amount. | Optional |
| actualAmount | Input | 00005 | Currency | An amount that has been pre-calculated for the Rating Engine to use, i.e., third-party discounts, pre-rating taxes, etc. | Optional |
| adjustedAmount | Output | 00006 | Currency | The amount with discounts and contracted rates applied as calculated in rating. | Optional |

FIG. 6A

| Variable | Input/Output | Variable Identifier | Type | Description | Usage Type Required |
|---|---|---|---|---|---|
| adjustedTime | Input | 00007 | Datetime | The time that rating will use for determining the rate. This is adjusted for any time zone differences between the calendar times and the network element time. | Optional |
| amount | Output | 00008 | Currency | The result of the rating calculation. | Optional |
| amountDiscount | Input | 00009 | Currency | The amount off the normal rate for discount purposes. | Optional |
| baseAmount | Output | 00010 | Currency | The amount prior to discounts calculated in rating. | Optional |
| contractDuration | Input | 00011 | Duration | The duration off the duration for contract purposes. | Optional |
| contractQuantity | Input | 00012 | Integer | The quantity off the quantity for contract purposes. | Optional |
| contractRate | Input | 00013 | Floating-Point | The rate for contract purposes. This tag has no value except the through the user-defined procedures, but is expected to be commonly used. | Optional |
| customerType | Input | 00014 | Symbol | The type of the customer as it relates to lookups in the calendar. | Optional |
| discountDuration | Input | 00015 | Duration | The duration off the duration for discount purposes. | Optional |
| contractQuantity | Input | 00016 | Integer | The quantity off the quantity for discount purposes. | Optional |
| discountRate | Input | 00017 | Floating-Point | The rate for discount purposes. | Optional |

FIG. 6B

| Variable | Input/Output | Variable Identifier | Type | Description | Usage Type Required |
|---|---|---|---|---|---|
| duration | Input | 00018 | Duration | The length of usage that needs to be rated. | Optional |
| explantion | Output | 00019 | String | The written version of how the Rating Engine derived its result(s). | Optional |
| percentageDiscount | Input | 00020 | Percentage | The percent off the normal rate for discount purposes. | Optional |
| promotionName | Input | 00021 | Symbol | The name of the promotional discount. | Optional |
| quantity | Input | 00022 | Integer | The number of units to be rated. | Optional |
| quantityUnitOfMeasurement | Input | 00023 | Symbol | The unit of measurement for the quantity such as connects or packets. | Optional |
| rateGroup | Input | 00024 | Symbol | The name of the rate group that the Rating Engine will use when looking up rates affected by rates group. | Optional |
| rateProvider | Input | 00025 | Symbol | The customer's rate provider or reseller. | Required |
| rateTableVersion | Output | 00026 | String | The version of the rate table | Optional |
| ratingEngineVersion | Output | 00027 | String | The version of the Rating Engine running. | Optional |
| ratingUsageTypeVersion | Output | 00028 | String | The version of the usage type. | Optional |
| startDateTime | Input | 00029 | Datetime | The time that rating may use for in the usage type procedures. This is typically the time off the network element. | Optional |
| testState | Input | 00030 | Boolean | Whether this is a test state or not | Required |

FIG. 6C

| Variable | Input/ Output | Variable Identifier | Type | Description | Usage Type Required |
|---|---|---|---|---|---|
| usageEventDateTime | Input | 00031 | Datetime | The date and time of the usage. | Required |
| usageType | Input | 00032 | Symbol | The type of usage that occurred. | Required |
| usageTypeProcedureInvoked | Output | 00033 | Symbol | The procedure name that was used by the Rating Engine. Used outside the Rating Engine to determine usage patterns. | Required |

FIG. 7

Define Variables

| Variable | Direction | Type | Variable ID |
|---|---|---|---|
| adjustedTime | Input | Duration | 7 |
| rateProvider | Input | Symbol | 25 |
| testState | Input | Boolean | 30 |
| usageEventDateTime | Input | DateTime | 31 |
| usageType | Input | Symbol | 32 |
| amount | Output | Currency | 8 |

[Close] [Apply] [Delete] [New]

Variable
  Name: Adjusted Time
  Direction: ● Input  ○ Output
  Type: Duration
  Variable ID: 7
  Description: The time that rating will use for determining the rate; adjusts for time zones

FIG. 9

| Decision Test Selection | |
|---|---|
| Input Variables | |
| Name | Type |
| Day Of Week | Symbol |
| Duration | Duration |
| Month Duration | Duration |
| OCP | Symbol |
| Discount Rate | Boolean |
| Account Type | Symbol |

Decision Test

Month Duration & Duration

[OK] [Cancel]

though it would be understood that the teachings of the present invention are applicable to rating systems for any type of usage event. In the exemplary rating system described herein, a rating engine 50 is provided which is logically decoupled from the rating database 20 at the time each usage event is processed. The rating database 20 provides the rating rules and rate tables that are used for a particular task (e.g., the rating of a particular event). The rating rules are a set of logical tools that are used to organize the business rules of the rating process. Business rules are the logic statements that form the basis of processing of a usage event (e.g., decisions and mathematical expressions). The rate tables provide rate information to the rating rules which may be used in rating an event.

APPARATUS AND METHOD FOR AN EVENT RATING ENGINE

FIELD OF THE INVENTION

The present invention relates to an apparatus and method for an event rating engine. In particular, the present invention relates to a system for rating varied types of usage events utilizing a rating engine specific to a defined task, the rating knowledge base providing the rating rules for the rating engine and being logically decoupled from the rating engine at the time each usage event is processed.

BACKGROUND INFORMATION

Conventional rating systems, such as used by telecommunication service providers or cable service providers, can rate specific types of events. For example, a telecommunications service provider, such as AT&T, MCI or SPRINT, utilizes a rating system for rating telephone calls placed on their network tailored specifically for rating telephone calls. A rating system for telecommunications services could not, for example, rate other types of usage events, such as cable services or pay-per-view events. Similarly, a cable service provider rating system is tailored to rating cable service or pay-per-view events and could not, for example, rate telecommunications services. As information processing and delivery systems progress, however, there is a need for the capability of service providers that deliver multiple types of services to customers to have a single system that can provide the required event usage rating capabilities. In addition, the Telecommunications Act of 1996 has lowered barriers to competition, thus encouraging cable television and telecommunications providers to enter each other's markets, furthering the need for such a system.

Many existing rating systems are batch-oriented, inflexible, difficult to maintain and based on outdated technology. For example, traditional event rating systems receive a batch of events to be rated and do not run until the batch arrives, thus precluding any real-time capabilities. In such a system, the flow of events is always behind. In addition, these traditional event rating systems are generally programmed systems with few references to rate tables. As a result, these traditional systems have each possible rate programmed into a portion of code and therefore, while efficient with respect to the processing of a particular usage event, these systems are inflexible and any changes to a rating database variable requires reprogramming with the resultant error introduction and debugging procedures, thus making the system difficult to modify.

Some existing rating systems are not limited to batch processing, however, and can rate, for example, call details and telephony features on an as-arrived basis. In these types of rating systems, though, the rating of particular usage events is tied to the rating table or knowledge base during the rating process. For example, when a usage event is to be rated, existing systems may use multiple reference tables that work in conjunction with the rating of the event. Such systems also try to price the event (e.g., apply basic rates, discounts and modifications) on a single pass through the rating engine to avoid accessing a rating database multiple times (e.g., as the same information may be needed multiple times for different purposes) with no consideration given to configuring the flow of event rating processing as being related to the type of event to be rated. While such a system may be more flexible than batch processing systems through the referencing of multiple rate tables, the existing systems are bound to a rating database (e.g., a knowledge base) during the rating process via a program that dictates fixed algorithms that attempt to accomplish all processing actions in a single pass through the rating engine, thus limiting the efficiency of the rating process.

SUMMARY OF THE INVENTION

The method and apparatus for an event rating engine according to the present invention provides a rating engine that can be configured for a particular task and is logically decoupled from the rating database when a usage event is rated. The rating engine and method according to an embodiment of the present invention includes, for example, a rating engine, a rating editor, a rating domain server and a rating database. The rating database includes rating rules that include, for example, rating business rules by usage type along with rate tables containing the current rate values. The rating domain server is, for example, an application domain server that provides an object-oriented interface to the rating rules. The rating editor provides, for example, a multi-user graphical user interface (GUI) to the rating domain server. At initialization, the rating engine downloads a set of rating rules from the rating database and interprets the rating rules to form an independent and autonomous rating process that can rate a usage event while being logically decoupled from the rating database during the rating process. Usage events may be provided to the rating engine from, for example, a queue manager, and the resultant rated events can be sent back to the queue manager.

BRIEF DESCRIPTION OF THE INVENTION

FIG. 4 illustrates an exemplary representation of an organization of a rating database according to an embodiment of the present invention.

FIG. 6 illustrates an exemplary table of system defined variables used in a rating system according to the present invention.

FIG. 7 illustrates an exemplary screen for defining variables according to an embodiment of the present invention.

FIG. 9 illustrates an exemplary decision test dialog according to an embodiment of the present invention.

DETAILED DESCRIPTION OF THE INVENTION

Figure 1:
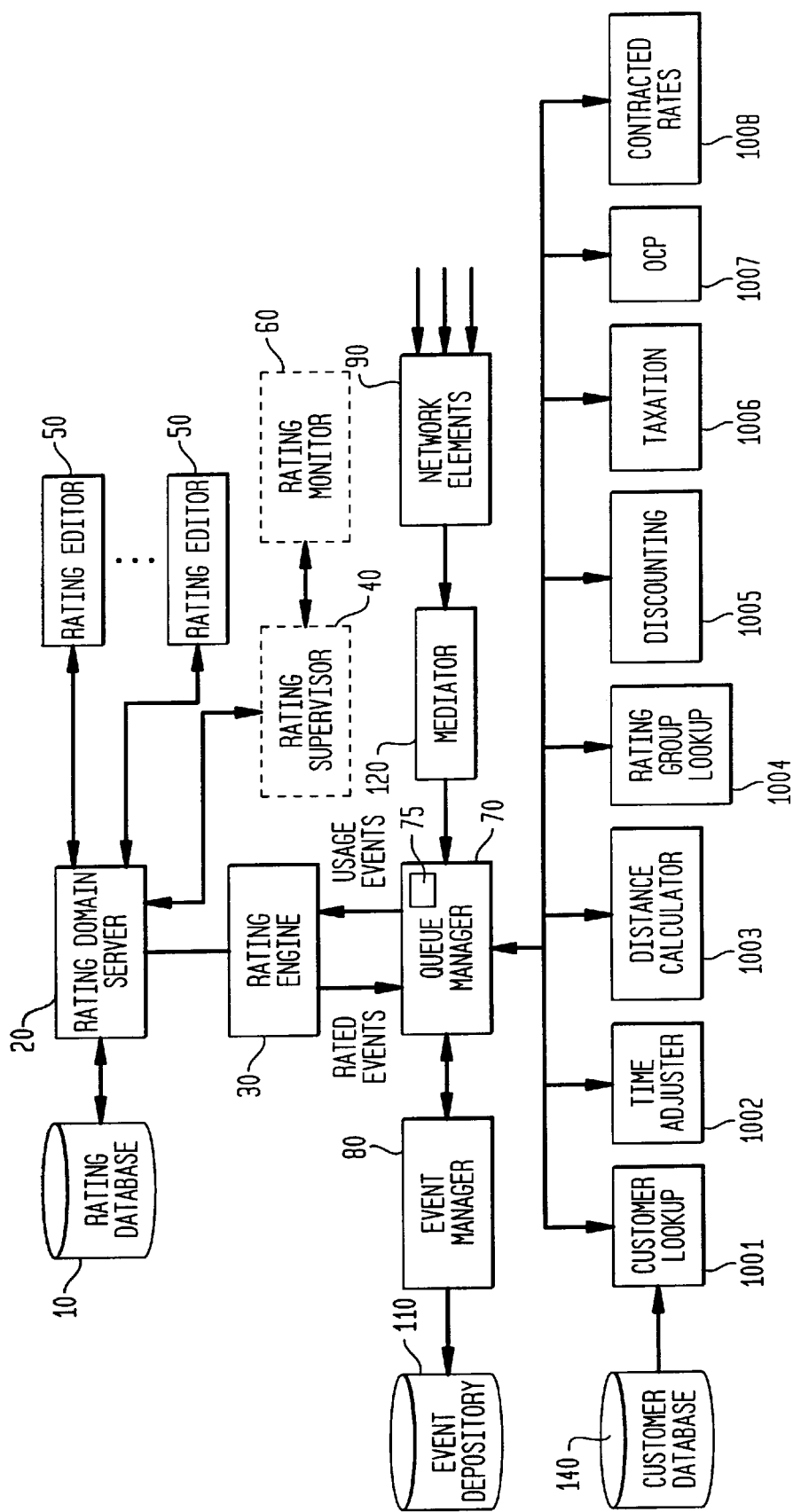
FIG. 1 illustrates an exemplary architecture of a rating system according to an embodiment of the present invention.

FIG. 1 illustrates an exemplary architecture of a rating system according to an embodiment of the present invention. A rating engine 3 0 is coupled to a rating domain server 20 and a queue manager 70. As indicated by the dashed lines, the rating domain server 20 may also be coupled to a rating supervisor 40 and, for example, to one or more rating editors 50. The rating supervisor 40 may also be coupled to a rating monitor 60. The rating domain server 20 is coupled to a rating database 10.

The queue manager 70 is coupled to an event manager 80 and service agents 1001 to 1008, which can be, for example, logical units of work such as an object, object class or shared service. A service agent thus includes, for example, a software component that implements a cohesive set of functional behavior. Via a mediator 120, the queue manager 70 is also connected to network elements 90, such as a SS7 switch or any device that registers usage events and sits in a network. The network element 90 could also be a non-network element, such as a device measuring gas usage for a utility or any device that measures usage. The mediator 120 can include, for example, a representative agent which may use GTE's InExchange software connected to an AT&T 5E switch interface that represents an external source on one side (e.g., a proprietary interface) and represents the rating system on the other side. The event manager 80 is coupled to an event repository 110 and at least one of the service agents 1001–1008 is connected to a customer database 140.

The software implementing the rating engine 30, the rating domain server 20, the rating database 10 and the rating supervisor 40 can be designed, for example, for enterprise servers such as a HEWLETT-PACKARD HP 9000 server running the HP-UX operating system, an IBM RS/6000 Scalable POWERparallel Systems server running the AIX operating system or a SUN MICROSYSTEMS UltraSPARC server running the SOLARIS operating system. The rating editor 50 and the rating monitor 60 can include, for example, an Intel 486-66 Mhz processor or faster personal computer running the WINDOWS 95 or WINDOWS NT operating system. The rating database 10 can be based on, for example, an ORACLE 7.3 database. To communicate to the rating database 10, standard SQL-92 (e.g., ANSI X3.135- 1992) can be used.

Figure 2:
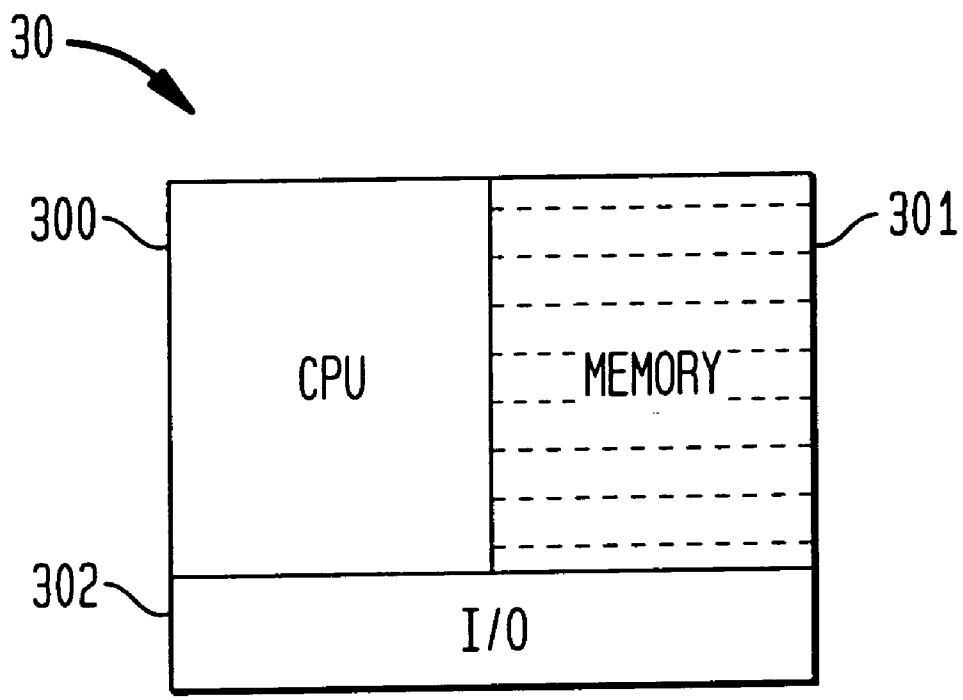
FIG. 2 illustrates an exemplary rating engine according to an embodiment of the present invention.

The rating engine 30 rates usage events. An exemplary rating engine 30 is illustrated in FIG. 2 and includes, for example, a central processing unit (CPU) 300, a memory 301 coupled to the CPU 300 and an I/O interface 302 coupled to the CPU 300. The rating engine 30 reads a usage event, such as the data relating to a telephone call, rates the usage event and outputs the rated event to a response queue of the queue manager 70. Usage events may be formatted in a way similar to that defined in the Abstract Syntax Notation one (ASN. 1) formatting standards. In particular, tag-length-value encoding may be employed to permit unknown or irrelevant data to be skipped without knowing its encoding. For example, each usage event may be defined by a header and a body. The header may contain control information for the usage event such as a unique event identification or routing information, and the body may contain a tag list of information about the usage event. Once the usage event is processed by the rating engine 30, additional tags may be added to the message. The usage event may be defined, in part, as a series of pre-defined tag-length-value triplets as illustrated, for example, in Tables 1A–1E.

Table 1A indicates exemplary required input tags used by the rating engine 30 to rate a usage event. The Test State tag relates to the ability of the rating engine 30 to, for example, output intermediate results including temporary variables generated by the operation of rating engine 30. Examples of the output variables that can be created for a usage event are shown in Table 1C. For example, if the test state is on, then auditing or debugging can be performed by instructing the rating engine 30 to provide temporary values used by a procedure of the rating engine 30 to expose an intermediate point such as Rate or This Time Duration (e.g., for historical purposes or auditing or debugging). The tags illustrated in Table 1C are merely illustrative and are easily created and could be defined to represent any desired value. The tags illustrated in Table 1C would be appended to the usage event information for further processing.

TABLE 1A

| System Input (Required) | |
| --- | --- |
| Tag | Description |
| Rate Provider | customer's rate provider or reseller |
| Usage Type | type of usage that occured |
| Usage Event Time | time of the usage |
| Test State | Whether this is a test state or not |

Table 1B illustrates exemplary optional usage event input tags that can be provided to the rating engine 30. For example the operation of particular service agents 1001–1008 can generate particular tags, such as Account Type, Accumulated Quantity or Customer Type and append each tag (including the tag, length and value) to the message for the usage event that is utilized by the rating engine 30. As is apparent, the input tags are generated external to the rating engine 30.

TABLE 1B

| Usage Event Input (Optional) | |
| --- | --- |
| Tag | Description |
| Account Type | name of account type that rating engine will use when looking up rates affected by account types |
| Accumulate Quantity or Determine Rate Amount | indicator used to accumulate the results into quantity or rate the results into an amount |
| Accumulated Quantity | quantity of units previously accumulated |
| Actual Amount | an amount that has been pre-calculated for the rating engine to use (e.g., third party discounts, prerating taxes) |

TABLE 1B-continued

Usage Event Input (Optional)

| Tag | Description |
| --- | --- |
| Adjusted Time | the time that rating engine will use for determining the rate (e.g., adjusted for any time zone differences between calendar time and the network element time |
| Amount Discount | amount off the normal rate for discount purposes |
| Customer Type | type of customer as it relates to lookups in the calendar |
| Contract Duration | the duration off the duration for contract purposes |
| Contract Quantity | the quantity off the quantity for contract purposes |
| Contract Rate | the rate for contract purposes |
| Discount Duration | the duration off the duration for discount purposes |
| Discount Quantity | the quantity off the quantity for discount purposes |
| Discount Rate | the rate for discount purposes |
| Duration | the length of the usage that needs to be rated |
| Rate Group | the name of the rate group that the rating engine will use when looking up rates affected by the rates group |
| Percentage Discount | the percent off the normal rate for discount purposes |
| Promotion Name | the name of a promotional discount |
| Quantity | the number of units to be rated |
| Quantity Unit of Measurement | the unit of measurement for the quantity such as connects or packets |
| Rate Table | the rate table to run against a test case |
| Start Time | the time that rating may use for the usage type cases |

TABLE 1C

Usage Event Derived (Optional)

| Tag | Description |
| --- | --- |
| Rate | the rate from the rate table |
| Rate Identifier | the rate identifier from the rate table |
| Rating Scheme | the type of rating to perform from the rate table |
| Remaining Time Duration | the time duration remaining after this time period |
| This Time Duration | the time duration for this period |
| Unit of Measurement | the unit of measurement from the rate table |
| Units Per Rate | the number of units per rate application from the rate table |

Table 1D illustrates the tag Usage Type Case Invoked which is always set as an output tag of a rated usage event to identify the procedure (e.g., algorithm) that was used by the rating engine 30 to rate the usage event. Table 1E illustrates additional optional tags that could be defined for a rated usage event and output with the rated usage event. These optional tags can be defined via the procedure executed by the rating engine 30 to rate the usage event.

TABLE 1D

Usage Event Output (Required)

| Tag | Description |
| --- | --- |
| Usage Type Case Invoked | the case name that was used by the rating engine |

TABLE 1E

Usage Event Output (Optional)

| Tag | Description |
| --- | --- |
| Accumulated Quantity | the quantity of units accumulated in rating |
| Adjusted Amount | the amount with discounts and contracted rates applied as calculated in rating |
| Amount | the result of the rating calculation |
| Base Amount | the amount prior to discounts calculated in rating |
| Explanation | written version of how the rating engine derived its results |
| Rating Engine Version | version of rating engine running |
| Rate Table Version | version of the rate table |
| Rating Usage Type Version | version of the usage type |

When a usage event occurs, such as a telephone call completed over the network of a long distance provider, a switch on the long distance network generates a call detail record, for example as indicated by network element 90 in FIG. 1. The call detail record can include the data identified in Table 1A, e.g., the rate provider (e.g., the long distance carrier), the usage type and the usage event time. The switch (e.g., the network element 90) on the service provider's network can be polled periodically by the mediator 120 illustrated in FIG. 1 which translates the data block from the switch (e.g., the call detail record) and maps the data block to a tag value set as described above. For example, the mediator 120 will determine the rate provider and the type of use (e.g., the identity of the network element 90 will identify the service/rate provider and the call type, contained in the call detail record, determines the type of use (event type)) and will append the tag values to the message for the usage event that is then forwarded to the event manager 80 via the queue manager 70. The event manager 80 may include, for example, UNIX platforms including symmetric multiprocessor enterprise servers. The event manager 80 is, for example, a logical entity that may physically reside alongside a service agent or the processing device the service agent is running on. The queue manager 70 manages high-reliability distributed persistent queues of service requests and service replies and may be, for example, a MQ Series queue manager manufactured by IBM so that an exemplary embodiment of the present invention provides for tag valued messages running on a queue manager.

When the message is received by the event manager 80, the event manager 80 retrieves a workplan from a workplan manager 75 which can, for example, reside with the queue manager 70 or can reside on one or more personal computers or servers. A workplan, as is known in the art, is an ordered sequence of tasks to be performed and may be done asynchronously (e.g., via a queue). The selected workplan is determined by the tag values of the message formed for each usage event. For example, a long distance call over a particular service provider's network will cause a particular workplan to be generated by the workplan manager 75. Each task of the workplan is performed by, for example, a service agent 1001–1008. The rating engine 30 and mediator 120 also act as a service agent (e.g., a single purpose service agent) and therefore also can be a task included in a workplan. For example, one of the tasks in a workplan generated by the workplan manager 75 can be a rating to be performed by the rating engine 30. The result of the workplan can be, for example, a rated call record on a customer account that starts with a usage event of a long distance call.

The service agents 1001–1008 as well as the rating engine 30 and mediator 120 can be used to build up the variables associated with a particular usage event (and thus are included in the message formed for the usage event). For example, the OCP (Optional Calling Plan) service agent 1007 illustrated in FIG. 1 can determine whether a particular telephone number is associated with an OCP, which information would then be added as a tag to the message for the usage event and be used by the rating engine 30 to rate the usage event. Similarly, as described previously, the mediator 120 determines the service provider and usage type, which determinations are used to establish the variables forming the message for the usage event.

Each service agent 1001–1008 as well as the rating engine 30 and the mediator 120 can be designed, for example, to perform a single well-defined task on a data stream that is accessed via a message queue interface to the queue manger 70. Such a design allows each service agent to be optimized for a single task and permits flexibility in configuration. The partitioning of functionality into independent software subcomponents (e.g., service agents that can be, for example, an object, object class, or shared service) that are not tightly coupled to any other process and instead rely on the workplan manager 75 to define a workplan for the routing of messages also allows for independent creation and maintenance of service agents and improved system throughput.

The service agents 1001–1008 as well as rating engine 30 and mediator 120 each include, for example, one or more well-defined interfaces that define the inputs expected and the outputs supplied and can be defined by the designer of the service agent. Service agents can perform different types of functions. For example, service agents could be representative agents (e.g., performing a stateless transformation on a service request or requesting creation of a workplan in response to an external event such as receipt of a call detail record such as mediator 120), rating agents (e.g., a rating engine 30) or a customer agent (e.g., responding to a change address service request). When a workplan is provided by the workplan manager 75 and then implemented by the event manager 80, each service agent in the ordered set of tasks of the workplan receives a service request which is then processed by the respective service agent by, for example, updating a local store of the service agent and/or supplying a set of output values as a service reply. When the final service agent completed its service request, the workplan is completed.

At start-up of the rating engine 30, for example prior to the rating of a usage event as a task in a workplan, a predetermined set of rating rules are downloaded from the rating database 10, via the rating domain server 20, and then the rating engine 30 reads in the providers of service with their, for example, usage types, cases, calendars, rate table as described in more detail below. A service provider, or rate provider, is the first classifier of a usage event and has, for example, one or more usage types, calendars and rate tables. Each rate provider has, for example, a name and a description. A usage type classifies the usage event upon which the rating engine 30 will rate. Examples of usage types are, for example, toll calls, international calls and operator service calls. Each usage type may have a name and a description. The rating engine 30 then determines how to create algorithms that implement the cases within the usage types. The ability of the rating engine 30 according to an embodiment of the present invention to determine how to implement the algorithms allows users of the rating system to create rating algorithms at a high level without being a software engineer.

For example, the rating engine 30, which can be, for example, implemented on a server running the UNIX operating system, can be initiated by running a program via a login procedure to the rating engine 30. Referring to FIG. 2, via the I/O 302 (e.g., a UNIX terminal), a user of the rating engine could run a program, for example as is known in the art by entering the name of an engine, such as ENGINE1, to initiate a script that loads the rating rules for ENGINE1 into the memory 301 of the rating engine 30. Then, for example, via the rating domain server 20, which responds to the script initiated by the login command for ENGINE1, an API of the rating domain server 20 retrieves a pre-defined set of rating rules from the rating database 10 for ENGINE1. The pre-defined set of rules for ENGINE1 can be determined in the rating system according to the present invention as described in more detail below. The rating engine 30 then loads the pre-defined set of rating rules into a designated portion of memory 301 in a known manner (e.g., the rating engine 30 interprets the rating rules and instantiates the interpreted rules as an executable file that is mapped into memory 301 in a manner efficient for processing) so that the loaded rating rules can be executed by the CPU 300 upon the submission of a usage event to the rating engine 30. After the rating rules are loaded into the memory 301, the rating database 10 (and thus the rating rules) are logically decoupled from the rating engine 30 as the rating engine 30 now has all of the rating rules necessary to rate any usage event associated with the particular instance of the rating engine 30 (e.g., ENGINE1). As is appreciated by those skilled in the art, the rating engine 30 can support multiple rating processes running simultaneously (e.g., multiple instances of rating engines such as ENGINE1, ENGINE2, etc. utilizing CPU 300 and memory 301).

In an exemplary embodiment of the present invention, the Phoenician procedure and decision test language can be used to write algorithms that are stored in the rating database 10 and executed by the rating engine 30. As described earlier, procedures are utilized to rate usage events and contain a series of assignments to output variables and derived values. A decision test is an arithmetic expression used to branch within a decision tree described below. When the rating engine 30 receives a usage event, the rating engine 30 runs through a decision tree for the usage event to determine the procedure to execute and then the assignment statements in the procedure are executed. The output variables and values are then appended onto the usage event. While the Phoenician language used to write the procedures is similar to C in terms of syntax, it is not a general purpose programming language.

In the Phoenician language, blank (space), end-of-line, vertical tab, form feed and horizontal tab are ignored except as used to separate adjacent tokens. A procedure line can be up to 100 characters and comments start with the characters //. There are eight classes of tokens: operators; separators; identifiers; variables; enumerations; symbols; reserved words; and constants. The Phoenician compiler will attempt to form the longest possible token and adjacent tokens may be followed by whitespace or comments. To prevent confusion, an identifier, reserved word, integer constant or floating-point constant is separated from a following identifier, reserved word, integer constant or floating-point constant. The Phoenician operators are AND OR NOT*−+= <>/≦≧. The separator characters are ( );.

An identifier, variable enumeration and symbol are a sequence of letters, digits and underscores. They must not begin with a digit and must not have the same spelling as a reserved word. Symbols begin and end with a single quote. Identifiers are function names; variables are either usage event input variables, usage event output variables or derived variables within a procedure or expression; enumerations are pre-defined types; and symbols are variable values, input parameters to functions or constants within a procedure or expression. The following tokens are reserved in the Phoenician language and must not be used as identifiers, variables, enumerations or symbols: CREATE_INCIDENT; FALSE; NULL; and TRUE.

An integer constant includes a nonempty sequence of digits. A floating point constant includes a nonempty sequence of digits followed by a decimal point followed by a nonempty sequence of digits. A percentage value includes of up to three sequence of digits followed optionally by a. followed by optionally by up to two digits followed by a %. All symbols are constants as are Rating Schemes, Units of Measurement, Round Methods, Time Frequencies, Months and Days of the Week. A duration constant includes optionally up to five digits followed by an optional: (the colon is not optional if there is one or more digits preceding it) followed by two digits followed by a: followed by two digits followed by an optional : (the colon is not optional if there is one or more digits preceding it) and optionally followed by afollowed by three digits (the period is not optional if a digit follows it). A time of day constant includes two digits followed by a: followed by two digits and optionally followed by a. followed by three digits (the period is not optional if a digit follows it). The digits for duration and time of day must correspond to values allowed for hours, minutes and seconds. As duration and time of day constants do not necessarily have distinguishing characteristics, the type of the parameter for the function call (e.g., based upon the other input parameter) can be used to determine the type of the constant. The NULL constant is used as an input to function calls for optional arguments and may not be used elsewhere.

In the Phoenician language, there are two types of declarations: explicit; and implicit. In explicit declarations, all input and output variables are explicitly declared in the usage type. In implicit declarations, all derived value variables are implicitly declared, e.g., they are declared when they are used. A type is a set of values and a set of operations on those values. The Phoenician language supports the types illustrated in FIG. 3. Function types may not be created in the Phoenician language but can be invoked. The function's return type can be any scalar type. Type conversions of boolean, symbol, datetime, object identifier or function values is not permitted in the Phoenician language. Conversions between integer and floating-point types is allowed implicitly.

Expressions and precedence in the Phoenician language utilize conventional relational operators (e.g., precedence and associativity) and mathematical operators (e.g., binary operator expressions). A function call includes a postfix expression (e.g., the function expression), a left parenthesis, a possibly empty sequence of expressions (e.g., the argument expressions) separated by commas, and then a right parenthesis. All functions return a scalar type and each function parameter is declared a scalar type. When calling a function, the typical arithmetic conversion is performed when the function is not overloaded. The argument expressions are evaluated in any order and the results passed into the function by value. No changes to the values of the arguments are reflected in the procedure once the function has returned. Function overloading is permitted (e.g., the ability to create multiple function instances that provide a common operation on different argument types to share a common name). Two or more functions can be given the same name provided that each signature is unique in either the number or types of their arguments. Overloaded functions must be called with an exact match of the argument and return types; implicit type conversions are not permitted. Default values for functions are supported with the default being NULL, a constant or the reserved words TRUE or FALSE. Default values occur at the end of the function signature. A function that provides default argument initializers can be invoked with or without a corresponding actual argument. Functions cannot be created in the Phoenician language but may be used.

A procedure includes zero or more assignment expressions potentially followed by a reserved word. Output variables and derived values can be set only once in a given procedure. The library functions of the Phoenician language may include the functions set forth below.

| Function | Description |
|---|---|
| int absolute(intx) | returns the absolute value of an integer |
| float absolute(float x) | returns the absolute value of a number |
| Symbol procedurename() | returns the name of the current procedure |
| float convertDurationToQuantity (Duration duration, UnitOfMeasurement unitOfMeasurement) | gets the number of time units depending upon the unit of measurement passed in and the duration |
| DayOfWeek dayofWeek (Datetime date) | gets the day of the week from a date/time |
| ObjectID getAdjacentTimePeriodGroups (Symbol, calendarName; Datetime time, Duration duration, Symbol customerType NULL) | gets the adjacent time period groups from the calendar based upon the time (e.g., on-hook time or off-hook time for a telephone call), a duration and an optional customer type; if the customer type does not have a time period group for this start time, then the regular time period group is returned (e.g., as though the customerType was set to NULL) |
| float getAmountcharged (ObjectID rateID, Duration duration) | returns amount charged based upon a rate in the rate table as related to a duration |
| float getAmountCharged (ObjectID rateID, int quantity) | gets the amount charged based upon a rate in the rate table and either the duration of time passed or the quantity used and allows tiered rates to be calculated the same as flat and fixed rates |
| float getMuitipleTimePeriodAmountCharged (ObjectID adjacentTimePeriodsGroup, ObjectID rateIDGroup, Boolean usePreviousAccumulation = TRUE, Duration startingAccumulation = 00;00) | gets the amount charges based upon an adjacent time periods group, a group of rates in the rate table, optionally whether to use the previous time periods quantity in determining the amount for this quantity (e.g., tiered rates) and optionally the accumulated duration before the first time period calculations start |
| RatingScheme getRatingscheme (ObjectID timePeriodGroup, Symbol rateGroup = NULL, Symbol accountType = NULL, symbol rateableComponent = NULL) | gets the rating scheme from the rate table based upon the time period group and optionally the rateGroup, accountType and rateableComponent |
| ObjectID getTimePeriodCalendarRate (ObjectID timePeriodGroup, Symbol rateGroup = NULL, Symbol accountType = NULL, Symbol rateableComponent = NULL) | gets the rate object identifier from the rate table based upon the time period group and optionaliy the rateGroup, accountType and rateable Component; if specified, the rateGroup, accountType and rateableComponent can be used and the defaut behavior as specified in getTimePeriodGroup does not occur |
| ObjectID getTimePeriodGroupCalendarRates (ObjectID adjacentTimePeriodsGroup, Symbol rateGroup = NULL, Symbol accountType = NULL, Symbol rateableComponent = NULL) | gets the rate object group identifler from the rate table based upon the adjacent time period group and optionally the rateGroup, accountType and rateableComponent; if specified, the rateGroup, accountType and rateableComponent can be used and the default behavior as specified in getTimePeriodGroup does not occur |
| ObjectID getTimePeriodGroup (Symbol calendarName, datetime time, Symbol customerType = NULL) | gets the time period group from the calendar based upon the time (e.g., on-hook time or Off-hook time) and an optional customer type; if the customer type does not have a time period group for this start time, then the regular time period, group is returned (e.g., as though the customerType was set to NULL) |
| TimeFrequency getTimePeriodType (Symbol calendarName, datetime time, Symbol customerType = NULL) | gets the type of time period from the calendar based upon the time (e.g., on-,hook time or off-hook time) and an optidnal customer type; if the customer type does not have a time period group for this start time, then the regular time period group is returned (e.g., as though the customerType was set to NULL) |
| UnitOfMeasurement getUnitoNeasurement (ObjectID timePeriodsGroup, Symbol rateGroup = NULL, Symbol accountType = NULL, Symbol rateableComponent = NULL) | gets the unit of measurement from the rate table based upon the time period group and optionally the rateGroup, accountType and rateableComponent |
| Boolean isInputVariable (Symbol inputVariable) | determines whether the input variable was in the usage event |
| datetime makeDate (int year, int month, int day, int hour, int minute, int | creates a datetime based upon the input parameters |

-continued

| Function | Description |
| --- | --- |
| second, int thousandths) | |
| Duration makeDuration (int days, int hours, int minutes; int seconds, int thousandths) | creates a duration based upon the input parameters |
| timeOfDay makeTimeOfDay (int hours, int seconds, int thousandths) | creates a timeOfDay based upon the input parameters |
| int max(int x, int y) | returns maximum value of two integers |
| float max(float x, float y) | returns the maximum of two numbers |
| int min(int x, int y) | returns the minimum value of two integers |
| float min(float x, float y) | returns the minimum of two numbers |
| int round(float x) | rounds to an integer value of a number |
| float round(float x, float precision | rounds to the nearest integral value with a fractional amount of 0.50 or greater using roundUp and a fractional amount less than 0.50 using round Down or can round to the nearest floating point number based upon the precision required (e.g., bounds the float x passed in by two floating point numbers (the next highest and lowest) with the specified precision and chooses the higher or lower number based upon which one is closest to the float x and when both are equidistant chooses the higher number) |
| int roundDown(float x) | rounds down a number |
| float roundDown(float x; float precision) | returns the greatest integral value less than or equal to the number passed in or can bound the float x passed: in by two floating-point numbers (the next highest and lowest) with the specified precision and chooses the lower number |
| int roundup(float x) | rounds up to a number |
| float roundUp(float x, float precision) | returns the least integral value greater than or equal to the number passed in or can bound the float x passed in by two floating point numbers (the next highest and lowest) with the specified precision and chooses the higher number |
| int roundWithRoundPoint (int x, int roundIncrement, int roundPoint) | forcing rounding or round point with integer value |
| float roundWithRoundpoint(float x, floatroundIncrement, float roundPoint) | forcing rounding or round point with number value |
| Duration roundWithRoundPoint(Duration x, Duration roundTo, Duration roundpoint) | rounds to the high or low integral, float or duration value passed into the function based upon the rounding point which is also passed in (e.g.; if a telephone call is rated on a per minute basis with a five second grace period, then the round would be 01:00 and the round point would be 06:00) |

An exemplary algorithm to be implemented for a rating engine 30 according to an embodiment of the present invention is set forth below. The exemplary algorithm describes, for example, initializing a rating engine 30 including loading a set of rating rules from the rating database 10, receiving a usage event and evaluating the decision trees for the usage event to determine the procedure to be executed and returning the output values of the procedure to be appended to the usage event message. As will be appreciated by those skilled in the art, the pseudocode set forth below is merely exemplary and other implementations of similar functions are within the scope of the present invention.

```
any.coerceType
any.convert
any.evaluate
any.setType
any.setValue
Assignment.getDerivedVdue
Assignment.getExpression
Assignment.getOutputVariable
Branch.evaluate
Calendar.getEffectiveEndDate
Calendar.getEffectiveStartDate
DerivedValue.coerceType
DerivedValue.getType
Event.createIncidentEvent
```

-continued

```
Event.getEventBody
EventBody.finished
EventBody.getinputTag
EventBody.getTagStringValue
EventBody.getTagValueLength
EventBody.insert
EventBody.replace
EventRateProvider.getInputVariable
Expression.evaluate
Expression.getValue
function.evaluate
getQueue getRatingServer
getRatingSupervisor
initializeGlobalDataStructures
operator.evaluate
Provider.getCalendars
Provider.getUsageTypes
Queue.getUsageEvent
Queue.isUsageEventWaiting
Queue.processedUsageEvent
RateProvider.optimizeCalendars
RateProvider.optimizeDecisionTrees
RateProvider.optimizeProcedures
RateProvider.optimizeRateTables
Server.getKB
startRatingThreads
String.parse
Supervisor.continueRating
UsageEventType.getDecisionTree
UsageType.getEffectiveEndDate
UsageType.getEffectiveStartDate
Variable.coerceType
Variable.getType
Variable.initialize
Global variables for the input and output variables defned in the SRS.
variable accountTyp();
variable accumulatedPriorQuantity();
variable accumulatedQuantity();
variable accumulateOrRateAmount();
variable actualAmount();
variable adjustedAmount();
variable adjustedTime();
variable amountDiscount();
variable baseAmount();
variable contracDuration();
variable contractQuantity();
variable contractRate();
variable customerType();
variable discountDuration();
variable discountQuantity();
variable discountRate.();
variable duration();
variable explanation();
variable percentageDiscount();
variable promotionName();
variable quantity();
variable quantityUnitOfMeasurement();
variable rateGroup();
variable rateProvider();
variable rateTableVersion();
variable ratingEngineVersion();
variable ratingUsageTypeVersion();
variable startDateTime();
variable testState();
variable UsageEventDateTime();
variable UsageType();
variable UsageTypeProcedureInvoked();
//Procedure: main
//Purpose: To set-up and run the run-time rating engine to rate usage events.
//Algorithm: Initialize the rating engine initializing the engine, hooking it up to the supervisor, server, and
//        event queue. Load the knowledge base frdm the server and optimize it. Then while the rating
//        supervisor hasn't told the engine to stop running, get the next usage event or sleep for a while.
//        If a usage event can be retrieved, then retrieve it, parse the body of the event, and then
//determine the values of the required variables. Get the right Version of the rate table und the //
possible calendars. Run the decision tree and then run the procedure.
// Finally, insert the output variables and values into the usage event and notify the event queue
// that this usage event was successfully processed.
void main ()
{
```

-continued

```
    Queue eventQueue;
    Supervisor ratingSupervisor;
    Server ratingServer;
    int sleepMilliseconds = 100;
    list rateProviders();
// Perform any global initialization required
// initializeRatingEngine();
// Initialize the required and optional system-defined variables
    intializeVariabies();
// Get tne rating supervisor
    rating Supervisor = getRatingSupervisor();
// Get the rating server
    ratingServer = getRatingServer();
// Get the event queue.
    eventQueue = getQueue();
// Load all of the rating knowledge base from the server
// and optimize it.
    rateProviders = ratingServer.loadAndOptimizeKB();
    wbile (ratingSupervisor.continueRatingo = TRUE)
{
if(EventQueue.isUsageEventWaitingo)
{
    UsageEvent event;
    map inputVariablesAndValues, outputVariabiesAndValues;
    Datetime eventDateTime;
    Symbol eventRateProviderSymbol, eventUsageTypeSymbol;
    Provider eventRateProvider;
    UsageType eventUsageType;
    RateTable eventRateTable;
    list eventCalendars;
    UsageTypeProcedure eventProcedure;
    Boolean testStatet createIncident;
    event = eventQueue. getUsageEvent();
    inputVariablesAndValues = event.parseEvent(eventRateProvider);
// Set the required input variabies and the object ids
    eventDateTime = inputVariablesAndValues.find(UsageEventDateTime);
    eventRateProviderSymbol
      = inputVariablesAndValues.find(UsageEventRateProvider);
    eventRateProvider = find_if (rateProviders.begin(),
                    rateProviders.end(),
                    equal(eventRateProviderSymbol));
    eventUsageTypeSymbol = inputVariablesAndValues.find(UsageType);
// Get the right Version of the Usage event.
    eventUsageType
      = eventRateProvider.getEventUsageType(eventUsageTypeSymbol,
                  eventDateTime);
    eventTestState = inputVariablesAndValues.find(testState);
// Now given the rate provider and Usage type, get the rate table
// and the appropriate calendars.
    eventRateTable = eventUsageType.getEventDateTable(eventDateTime);
    eventCalendars = eventRateProvider.getEventValendars(eventRateTime);
// Run the decision given the usage event and return the successful procedure. eyentProcedure
      = eventUsageType.runDecisionTree(inputVariablesAndValues,
                    eventRateTable, eventCalendars,
                    eventTestState);
// Run the successful case
    outputVariablesAndValues = eventProcedure.run(inputVariablesAndValues,
        eventRateTable,
                    eventCalendars,
                    eventTestState,
                    createIncident);
// Add the output variables to the Usage event
outputVariablesAndValues.insert(UsageTypeProcedureInvoked,
                    eventCase.Name());
    event.addOutputVariablesAndValues(inputVariablesAndValues,
                    outputVariablesAndValues);
// Notify the event manager that this one was processed.
// Set any special incident infonnation in the event, if necessary.
    if (createIncident)
       event.createIncidentEvent();
    eventQueue.processedUsageEvent(event);
    }
else
   sleep(sleepMilliseconds);
   }
}
// Procedure: initializeVariables
// Purpose: To initiahze the global variables for the input and output
    variables defined in the SRS.
```

-continued

```
// Algorithm: Initialize the global variables by converting from a string
   to a symbol.
void initializeVariables()
{
   accountType.initalize("accountType", enumerationType);
   accumulatedPriorQuantity.initialize(IlaccumulatedPriorQuantity", integerType);
   accumulatedQuantity.initalize("accumulatedQuantity", integerType);
   accumulateOrRateAmount.initialize("accumulateOrRateAmount", enumerationType);
   actualAmount.initialize("actualAmount", currencyType);
   adjustedAmount.initialize("adjustedAmount", currencyType);
   adjustedTime.initialize(IladjustedTime", datetimeType);
   amount.initialize("amount", currencyType);
   amountDiscount.initialize(IlamountDiscount", currencyType);
   baseAmount.initialize("baseAmount", currencyType);
   contractDuration.initialize("contractDuration", durationType);
   contractQuantity.initialize("contractQuantity", integerType);
   contractRate.initilize(IlcontractRate", floatingType);
   customerType.initialize(IlcustomerType", enumerationType);
   discountDuration.initialize("discountDuration", durationType);
   discountQuantity.initialize("discountQuantity", integerType);
   discounate.initialize(I'discounIRate", floatingType);
   duration.initialize(I'duration", durationType);
   exanation.initialize("explanation", stringType);
   percentageDiscount.initialize(IlpercentageDiscount", percentageType);
   promotionName.initialize("promotionName", syinbType);
   quantity.initialize("quantity", integerType);.
   quantityUnitOfMeasurement.initialize("quantityUnitOfMeasurement", enumerationType)
rateGroup .initialize("rateGroup", enumerationType);
   rateProvider.initialize("rateProvider", symbolType);
   rateTableVersion.initialize("rateTableVersion", stringType);
   ratingEngineVersion.initialize("ratingEngineVersion", stringType);
   ratingUsageTypeVersion.initialize("ratingUsageTypeVersion"F stringType);
   startDateTime.initialize("startDateTime", datetimeType);
   testState.initialize("testState", booleanType);
   UsageEventDateTime.initialize("UsageEventDateTime", datetimeType);
   UsageType.initialize("UsageType", symbolType);
   UsageTypeProcedureInvoked.initialize("UsageTypeProcedureInvoked', symbolType);
}
// Procedure: initializeRatingEngine
// Purpose: Perform in any global initialization required.
// This may involve setting up of global data structures,
   starting threads, etc.
// Algorithm: Run to sub-initialization procedures.
void initializeRatingEngine()
{
   initilizeGlobalDataStructures();
   startRatingThreads();
}
// Procedure: Server loadAndOptimizeKB
// Purpose: Load all of the rating knowledge base from the server and optimize it. This includes all //
   providers, Usage type information, calendars, rate tables, accoant types, customer types, rate //
   groups, time period groups, etc. that are active at the time the engine was started.
// Algorithm: Load the knowledge base and optimize the objects under each rate provider.
// Note(s): The objects will be local to the ratig engine as a result of this function. Return all of the rate
   providers found. Objects that will not be used in the process of rating will not be transferred
   as well as relationships that are not needed. Examples are the user who made the change, the //
   previous versions of this object, cloning information, etc.
list Server.loadAndOptimizeKB()
{
   list rateProviders();
   // API function call
   rateProviders = server.getKB();
   for_each (rateProviders.begin(), rateProviders.end(), optimizeProvider);
   return rateProviders;
}
// Procedure: optimizeProvider
// Purpose: Optimize the rate provider objects.
// The optimizations include linearizing the calendar, making the rate table lookups faster, //
   optimizing the performance of the decision tree optimizing the performance of the
// procedures, etc. to increase the peformance of the rating engine.
// Algorithm: Optimize the objects.
void optimizeProvider(Provider rateProvider)
{
   rateProvider.optimizecalendars();
   rateProvider.optimizeRateTables();
   rateProvider.optimizeDecisionTrees();
   rateProvider.optimizeProcedures();
// Procedure: Event.parseEvent
// Purpose: To convert the Usage event from a string to a series of variables and values.
```

-continued

```
// Algorithm: Partially parse tbe Usage event by going over the body of the event first getting the variables
// ID, then the length of the value, and then getting the value.
// Determine the symbol of the variable and its value and return a list of the ones that the rating
// subsystem knows about.
map Event.parseEvent(Provider eventRateProvider)
{
   map variablesAndValues();
   map inputTagsAndVariables();
   Body eventBody;
   evenody = event.getEventBody();
   while (eventBody.finished() = FALSE)
      int inputTag = eventBody.gethInputTag();
      int valueLength = eventBody.getTagValueLength();
      String inputTagValue = eventBody.getTagStringValue(valueLength.);
      Variable inputVariable = eventRateProvider.gethInputVariable(inputTag);
      Type variableType = inputVariable.getType();
      // There may be variables that the rating system does not know about.
      if (inputVariable != NULL)
      {
         any variableValue;
         // Set up the type and value for the varable's value.
                  variableValue.setType(variableType);
         variableValue.setValue(inputTagValue.parse(variableType));
         variablesAndValues.insert(inputVariable, variableValue);
      }
   return variablesAndValues
}
// Procedure: Provider.getEventUsageType
// Purpose: Return the current version of the usage type.
// Algorithm: Get the Version of the usage type that has an effective start date and an effective end date //
      between the event's date.
UsageType Provider. getEventUsageType(Symbol eventUsageTypeSymbol,
                        Datetime eventDateTime)
list UsageTypes();
UsageType providerUsageType;
UsageTypes = provider.getUsageTypes(eventUsageTypeSymbol);
for(providerUsageType = UsageTypes.begin();
providerUsageType != usageTypes.end(); ++providerUsageType)
if providerUsageType.getEffectiveStartDate() >= eventDateTime &&
providerUsageType.getEffectiveEndDate() <= eventDateTime)
return providerUsageType;
// Procedure: UsageType.getEventRateTable
// Purpose: Return the current version of the rate table.
// Algorithm: Get the version of the rate table that has an effective start date and an effective end date between
      the event's date.
RateTable UsageType.getEventRateTable(Datetime eventDateTime)
list rateTables();
RateTable currentRateTable;
rateTables = UsageType. getRateTables();
for(currentRateTable rateTables.begin();
currentRateTable != rateTables.end();
++currentRateTAble)
if (currentRateTable.getEffectiveStartDate() >= eventDateTime &&
currentRateTable.getEffectiveEndDate() <= eventDateTime)
return currentRateTable;
//Procedure: Provider.getEventCalendars
//Purpose: Return the calendars that are in effect.
//Algorithm; Get the version of the calendar(s) that have an effective start date and an effective end date
//between the event's date.
list Provider.getEventCalendars(Datetime eventDateTime)
list allCalendars();
list calendars();
Calendar providerCalendar;
allCalendars = provider.getCalendars();
for(providerCalendar = allCalendars.begin();.
providerCalendar ?= allCalendars.end(); ++providerCalendar)
if providerCalendar.getEffectiveStartDate() >= eventDateTime &&
providerCalendar.getEffectiveEndDate() <= eventDateTime)
calendars.insert(providerCalendar);
return calendars;
//Procedure: UsageType.runDecisionTree
//Purpose: Run the decision tree and return the procedure.
//Algorithm: Go down the decision tree until a procedure is found.
//Note(s): The parameter eventTestState is not used in this version of the algorithm; but will be used to generate
//the explanation and additional output variables and values in the run-time rating engine. Since it does not
//impact how the rating will occur and would add significant complexity to the pseudocode, this portion of the
//algorithm was left out.
UsageTypeProcedure UsageType.runDecisionTree(map inputVariablesAndValues,
RateTable eventRateTable,
```

-continued

```
list eventCalendars, Boolean eventTestState)
DecisionBranch currentBranch;
DecisionBranch nextBranch;
UsageTypeProcedure returnProcedure;
Boolean done - FALSE;
currentBranch = UsageEventType.getDecisionTree();
while (!done)
// The branch may be using an input variable or be the result of an expression. If an expression was used, then //
// the branch will call the function expression.eyaluate which is 'isted below. The variable 5 value or resulting //
// value are compared to the values in the branch and the next branch or a procedure is found. It returns TRUE ifi/
// the result is a procedure and FALSE if the result is another branch.
done = currentBranch.evaluate(inputVariablesAndValues, eventRateTable,
eventCalendars, eventTestState,
&nextBranch, &returnProcedure);
if(!done)
currentBranch = nextBranch;
return returnProcedure;
// Procedure: UsageTypeProcedure.run
// Purpose: Run the successful procedure.
// Algorithm: For each assignment statement in the procedure:
// if the statement is an assignrnent of an output variable:. Get the right side output variable and its data type. Get
// the left side expression and evaluate it. Coerce the evaluated expression's data type, if necessary to match that
// of the output variable. Add the output variable and value to the list to be returned and for use in subsequent//
statements.
// If the statement is an assignment of an derived value. Get the right side derived value and its data type. Get//
the left side expression and evaluate it. Coerce the evaluated expression's data type, if necessary to match that //
of the derived value. Add the derived value and value to the list for use in subsequent statements.
// IF the statement is to create an incident:
// Set the incident flag to true.
// Note(s): The parameter eventTestState is not used in this version of the
// algorithm, but will be used to generate the explanation and
// additional output variaes and values in the run-time rating
// engine; it does not impact how the rating will occur
map UsageTypeProcedure.run(map inputVariablesAndValues, RateTable eventRateTable, list eventCalendars,
Boolean eventTestState, Boolean &createIncident)
list assignments();
Assignment statement;
list outputVariablesAndValues();
list derivedValuesAndValues();
createIncident = FALSE;
for (statement = assignments.start();
statement != assignments.end(); ++statement)
if (statement.derivedValue ==NULIL)I
Variable outputVariable;
ObjectType type;
any outputValue;
Expression outputExpression;
outputVariable = statement. getOutputVariable();.
type = outputVariable.getType();
outputExpression = statement.getExpression(),
outputValue = outputExpression.evaluate(inputVariablesAndValues, eventRateTable, eventCalendars,
derivedValuesAndValues, outputVariablesAndValues);
outputValue.coerceType(type);
outputVariablesAndValues.insert(outputVariable, outputValue);
else if (statement.derivedValue)
Value derivedValue;
ObjectType type;
any derivedValue;
Expression derivedExpression;
derivedValue = statement.getDerivedValue();
type = derivedValue.getType();
derivedExpression = statement.getExpression();
derivedValue = derivedExpression.evaluate(inputValuesAndValues, eventRateTable, eventCalendars,
derivedValuesAndValues, outputVariablesAndValues);
derivedValue.coerceType(type);
derivedValuesAndValues.insert(derivedValue, derivedValue);
else createIncident = TRUE;
return outputVariablesAndValues;
// Procedure: Expression.evaluate
// Purpose: valuate Purpose: Evaluate in expression and returns its value.
// Algorithm: ff the expression is a function, then evaluate the function and return the value of the evaluation. If
// the expression is an input variable, then retrieve and return the value of the variable. If the expression is an //
output variable, then retrieve and return the value of the variable. If the expression is an derived value, then //
retrieve and return the value of the derived value. Else return the value.
any Expression.evaluate(map inputVariables And Values, RateTable eventRateTable, list eventCalendars, map
derivedValuesAndValues, map outputVariablesAndValues) any anyValue = expression.getValue();
if(anyValue.getTypeo = functionType)
return (anyValue.getValueo).evaluate(inputVariablesAndValues,
eventRateTable, eventCalendars, derivedValuesAndValues,
```

-continued

```
outputVariablesAndValues)
elseif (anyValue.getTypeo = inputVariableType)
return inputVariablesAndValues.find(anyValue. getValue())
else if (anyValue.getTypeo = outputVariableType)
return outputVariablesAndvalues.find(anyValue.getValue())
else if (anyValue, getTypeo = derivedValueType)
return derivedValuesAndValues.find(anyValue.getValue)
else
return any Value;
// Procedure: UsageEvent.addOutputVariablesAndValues Purpose: Add the output variables and values to the //
usage event. Algorithm: Add each output variable and value to the event body.
void UsageEvent.addOutputVariablesAndValues(map inputVariablesAndValues, map
outputVariablesAndValues) Body eventBody;
eventBody = UsageEvent.getEventBody();.
for_each(variablesAndValues.begino, variablesAndValues.endo,
addOutputVariable(inputVariablesAndValues, eventBody));
// Procedure: addOutputVariable Purpose: Add an output variables and value to the Usage event. Algorithm: //
Either add a new variable and value to the usage event or replace one that already exists.
void addOutputVariable(map inputVariablesAndValues Body eventBody, pair variableAndValue)
if (find(inputVariablesAndValues.begino, inputVariablesAndValues.endo, variableAndValue.firsto) = TRUE)
eventBody.reace(variableAndValue.first(), variableAndValue. second()) else
eventBody.insert(variableAndValue.first(), variableAndValue.second());
// Below are a few of the functions that are part of the Phoenician language. This includes a function cail, a //
unary expression; a binary operator rnathematicai expression, and a binary operator relational expression. //
These are called by the expression evaluate function in the first conditional.
// Procedure: Plus.evaluate Purpose: Add two values together (arithmetic, duration, or duration and datetime). //
Algorithm: Evaluate the first and second arguments to this operator. Coerce the values, ifnecessary, add them //
together, and return the result.
any Plus.evaluate(map inputVariablesAndValues, RateTable eventRateTable, list eventCalendars, map
derivedValuesAndValues, map outputVariablesAndValues)
Expression arg1;
Expression arg2;
any arg1Value;
any arg2Value;
arg1 = Plus.getArg1();
arg2 = Plus.getArg2();
arg1Value = arg1.evaluate(inputValuesAndValues; eventRateTae, eventCalendars, derivedValuesAndValues,
outputVariablesAndValues);
arg2Value = arg2.evaluate(inputValuesAndValues, eventRateTable, eventCalendars, derivedValuesAndValues,
outputVariablesAndValues);
arg1Value.coerceType(arg2Value.getTypeo);
Overloaded operator or straight addition
arg1Value. setValue((arg1Value. getValueo + arg2Value. getValueo()));
return arg1Value;
// Procedure: Not.evauate Purpose: Return the negation of the agument. Algorithm: Evaluate the first argument
// to this operator. Return the negation of the evaluation.
any Not. evaluate(inap inputVariablesAndValues, RateTable eventDateTable, list eventCalendars, map
derivedValuesAndvalues; map outputVariablesAndValues)
Expression arg1;
any arg1Value;
arg1 = not.getArg1();
arg1Value = arg1.evaluate(inputValuesAndValues, eventRateTable; eventCalendais, derivedValuesAndValues,
outputVariablesAndValues);
arg1Value.setValue((!arg1Value.getValueo));
return arg1Value;
// Procedure: Less Than.evaluate Purpose: Return whether the first argument is less than the second argrment
// (arithmetic, duration, or datetime). Algorithm: Evaluate the first and second arguements to this operator. Coerce
// the values, ifnecessary, detertnine whether the first arguement is Iess than the second and return the result.
any Less Than.evaluate(map inputVariablesAndValues, RateTable eventRateTable, list eventCalendars, map
derivedValuesAndValues, map outputVariablesAndValues)
Expression arg1;
Expression arg2;
any arg1Value;
any arg2Value;
any returnValue;
arg1 = lessthan.getArg1();
arg2 = lessthan.getArg2();
argValue = arg1.evaluate(inputValuesAndValues, eventRateTable, eventCalendars, derivedValuesAndValues,
outputVariablesAndValues);
arg2Value = arg2.evaluate(inputValuesAndValues, eventRateTable, eventCalendars, derivedValuesAndValues,
outputVariablesAndValues);
arg1Value.coerceType(arg2Value.getType();
returnValue. setType(booleanType);
// Overloaded operator or lessthan returnValue.setValue((arg1Value.getValueo < alg2Value.getValueo));
return returnValue;
// Procedure: And.evaluate Purpose: Return whether the first argument and the second arguement are true. //
Algorithm;
// Evaluate the first and second arguemehts to this operator. Return whether they are both TRUE or not.
any And.evaluate(map inputVariablesAndValues, RateTable eventRateTable, list eventCalendars, map
```

-continued

```
derivedValuesAndValues, tnap outputVariablesAndValues)
Expression arg1;
Expression arg2;
any arg1Value;
any arg2Value;
any returnValue;
arg1 = and.getArg1();
arg2 = and.getArg2();
arg1Value = arg1.evaluate(inputValuesAndValues, eventRateTable, eventCalendars, derivedValuesAndValues,
outputVariablesAndValues);
arg2Value = arg2.evaluate(inputValuesAndValues, even.ateTable, eventCalendars, derivedValuesAndValues,
outputVariablesAndValues);
arg1Value.coerceType(arg2Value.getTypeo);
returnValue.setType(booleanType);
returnValue.setValue((arg1Value.getValue() && arg2Value.getValueo));
return returnValue;
// Procedure: ConvertDataToQuantity.evuate Purpose: Return the quantity of the duration based upon the unit
// of measurement. Algorithm: Evaluate the first and second arguements to this function. Return the converted //
floating point value.
value ConvertDataToQuantity.evaluate(map inputvariablesAndValues, RateTable eventRateTable, list
eventCalendars, map derivedValuesAndValues, map outputYariablesAndValues)
Expression arg1;
Expression arg2;
any arg1Value;
any arg2Value;
any returnValue;
Duration thisDuration;
arg1 = convertDataToQuantity.getArg1();
arg2 = convertDataToQuantity.getArg2();
arg1Value = arg1.evaluate(inputViluesAndValues, eventRateTable, eventCalendars, derivedValuesAndValues,
outputVariablesAndValues);
arg2Value = arg2.evaluate(inputValuesAndValues, eventRateTable, eventCalendars, derivedValuesAndValues,
outputVariablesAndValues);
returnValue.getType(floatType);
thisDuration = arg1Value.getValue();
return Value.setValue((thisDuration.convert(arg2Value.getValueo)));
return returnValue;
}
```

The rating domain server 20 provides a mechanism to decouple a user interface layer from a domain layer of the rating application. The rating domain server 20 can be, for example, compliant with Common Object Request Broker Architecture (CORBA) and includes, for example, a series of application programmer interface (API) function calls. Typical operations of the rating domain server 20 can include, for example, object creation, copying, deletion, getting and setting of attributes, validation and retrieving lists of object identifiers. Objects manipulated by the user interface may be created, manipulated and deleted by the rating domain server 20. In addition, via an API of the rating domain server 20, the rating engine 30 can make a functional call to load the data needed by the rating engine 30 from the rating database 10 at initialization of the rating engine 30 as described earlier.

The rating editor 50 is an authoring system, e.g., a software application that allows users to create and edit a rating subsystem knowledge base, e.g., the rating database 10. For example, via the rating editor 50, a user can create and manipulate, for example, rate providers, calendars, usage types and decision trees stored in the rating database 10 to allow the rating engine 30 to rate usage events via the downloaded rating rules that define the rating engine. The rating editor 50 thus provides, for example, a graphical user interface to the rating domain server 20 and thus into the rating database 10. The rating editor 50 can be, for example, a PENTIUM microprocessor based device running either a WINDOWS 95 or WINDOWS NT operating system. The rating editor 50 uses, for example, the APIs of the rating domain server 20 to create, access, modify and delete the persistent object it manipulates. Table 2 illustrates the exemplary functionalities of the rating editor 50.

| Functionality | Description |
| --- | --- |
| Rate Provider | allows creation, editing, copying and updating of rate providers |
| Usage Type | allows creation, editing, copying and validation of Usage wpes |
| Calendar | allows creation, editing, copying and validation of calendars |
| Case | allows creation, editing, copying and validation of cases |
| Rate Copy Outliner | displays the copy and Version history of rate providers, Usage types, cases, Usage type tests and calendars |
| Rate Groups | allows creation, editing and validation of rate groups |
| Account Type | allows creation, editing and validation of account types |
| Usage Type Test | allows creation, editing, copying, validation, running and comparing of Usage type tests |

-continued

| Functionality | Description |
| --- | --- |
| Rate Table | allows creation, editing, importing, exporting and validation of the rate table |
| Rating Monitor | allows startup, shutdown and monitoring of the rating engine |

The rating database 10 includes, for example, a relational database that stores rating rules. The rating database 10 can store, for example, rate providers, usage types, cases, calendars, rate groups, rate tables, customer types, account types or rating users. The organization of an exemplary interface to a rate table in an exemplary rating database 10 is shown in FIG. 4. The rating database 10 generally will not store usage data generated by the rating engine 30 as the rating database 10 and the rating engine 30 are logically decoupled after the rating rules are loaded into the rating engine 30.

Input variables, output variables and derived values are all typed (e.g., characterized by attributes) in the rating subsystem. Input and output variables such as illustrated in Tables 1A and 1B have, for example, the following attributes that are set when the variable is defined: variable name; variable identifier; type; description; usage type required; optional for usage type; and system defined. An exemplary table of system defined variables used in a rating system according to an embodiment of the present invention is shown in FIG. 6.

Figure 3:
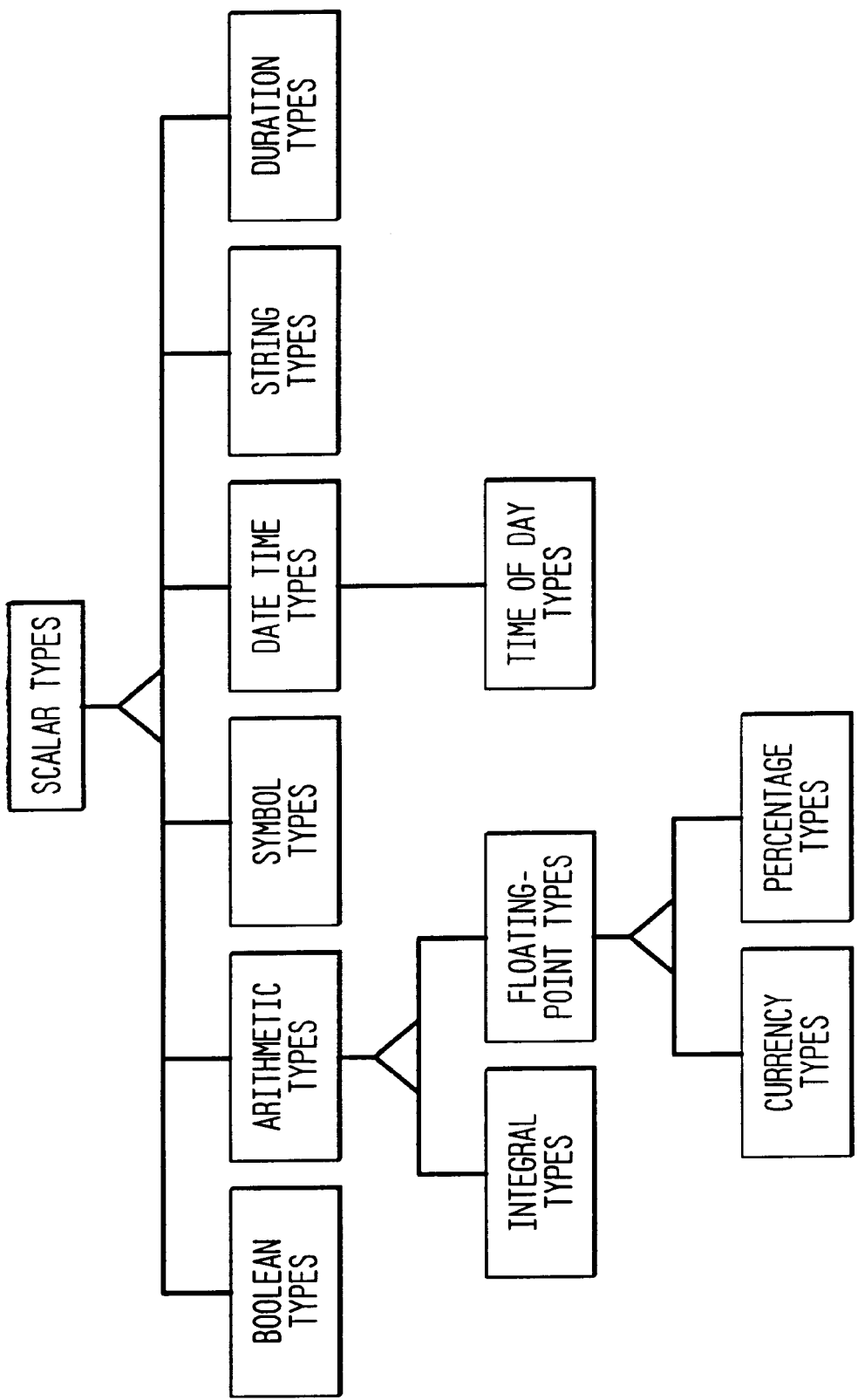
FIG. 3 illustrates an exemplary types of variables used in an embodiment of the present invention.

A variable name is a sequence of letters, digits and underscores and a variable identifier is an unsigned short integer that uniquely identifies the variable in the rating subsystem and can be, for example, an alternate key to the variable name. The variable identifier can be used, for example, in the encoding of usage events to save space (e.g., memory and disk) and to reduce the time to parse usage events. In the rating subsystem, which includes, for example, the rating engine 30, rating domain server 20 and rating database 10, input variables and output variables support, for example, the following types, as illustrated in FIG. 3: boolean (e.g., TRUE and FALSE); arithmetic; symbol (e.g., a sequence of letters, digits and underscores); date time (e.g., the year, month, date, hour, minute, second and subsecond in digit format); string (e.g., a sequence of characters); and duration (e.g., day, hour, minute, second and subsecond in digit format). The arithmetic type can include, for example, integral and floating point types, while the floating point type can include, for example, currency and percentage types. The date time type can include, for example, a time of day type (e.g., hour, minute, second, subsecond digit format). A description of a variable includes, for example, words representing the meaning of the variable separate from the variable name itself Usage type required is related to one of a number of pre-defined input and output variables in the rating subsystem.

The rating supervisor 40 starts and stops the rating engine 30. The rating supervisor 40 can be implemented, for example, as a domain layer with a callable API from the user interface. The rating monitor 60 can be, for example, a simple GUI application running on, for example, a personal computer that provides an interface to the rating supervisor 40.

The rating editor 50, as described above, allows users of the rating engine 30 to create and edit providers and variables. For example, with a specified provider, for example a long distance service provider, a user can edit the objects which are used by the rating engine 30 to determine how to rate usage events. These objects include, for example, variable and time group decisions, calendars, rate tables and usage events. The user interface for the rating editor 50 can, for example, adhere to the WINDOWS operating system user interface conventions. The interface of the rating editor 50 can include, for example, the following parts: login dialog; rating editor screen; rating editor menus; menu dialogs; declarations view; calendar view; usage type view; and rate table view.

Figure 5:
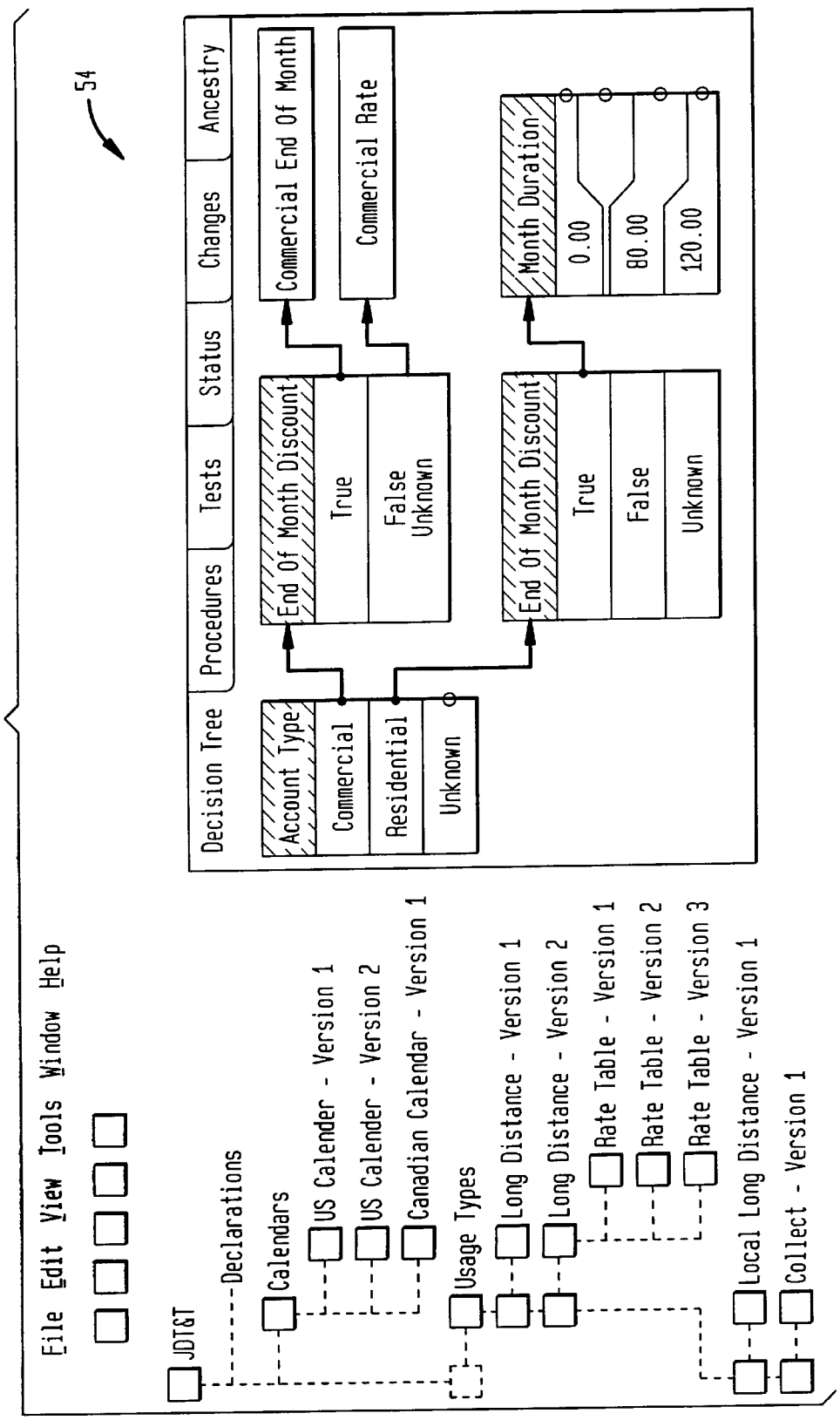
FIG. 5 illustrates an exemplary rating editor screen according to an embodiment of the present invention.

The login dialog permits a known user of the rating editor 50 to log into the system. An exemplary rating editor screen, illustrated in FIG. 5, contains, for example, four parts: a menu bar 51; a toolbar 52 for accessing common menu commands; a provider tree 53 for viewing a structured listing of the objects in a single provider; and a multi-document interface 54 for viewing and editing parts of the knowledge base, e.g., the rating database 10. The menu bar 51 can include, for example, conventional WINDOWS operating system menus such as FILE, EDIT, VIEW, TOOLS, WINDOWS and HELP. Thus, for example, via the FILE menu of menu bar 52, new or existing calendars or usage types can be opened, variables can be defined, for example as shown in FIG. 7, and new providers can be added or existing providers can be opened. Via the TOOLS menu of menu bar 52, for example, a number of operations can be performed, for example adding branches to a decision tree, adding a procedure or importing or exporting rate tables.

Many menu dialogs can be provided by the rating editor 50. For example, as set forth above, the rating editor 50 can provide a dialog to login, to create new calendars and usage types (e.g., for a current provider), to open existing calendars or rate tables (e.g., for a current provider) or usage types, to define variables (e.g., as illustrated in FIG. 7), to create a new provider or to open existing providers. For example, a dialog can be provided for the screen shown in FIG. 7 which allows a user of the rating system to create and edit a list of variables.

The declarations view for the rating editor 50 allows, for example, for editing the possible values of any variable whose value may be a symbol. Since the set of values is specific to the current provider, an input variable may have a different set of symbolic values per provider. For example, for a variable such as Account Types, which has a symbol value, the declarations view of the rating editor 50 allows a user to select, for example, whether the Account Type symbolic value is Commercial, Residential or University while the variable Account Type may have other symbols values for a different provider.

The calendar view of the rating editor 50 defines, for example, all of the time periods for a particular provider. For example, the calendar view provides a user interface to edit and create time periods. Each time period created by a user can have, for example, a name, a customer type for whom it is connected, a starting and end time, a time group that it is within and a specification of when it periodically occurs. For example, the calendar view could provide a dialog to name a time period, such as SpecialGiveAway, to occur weekly on a selected day at a selected time or to name Christmas to occur annually on December 25.

Figure 8:
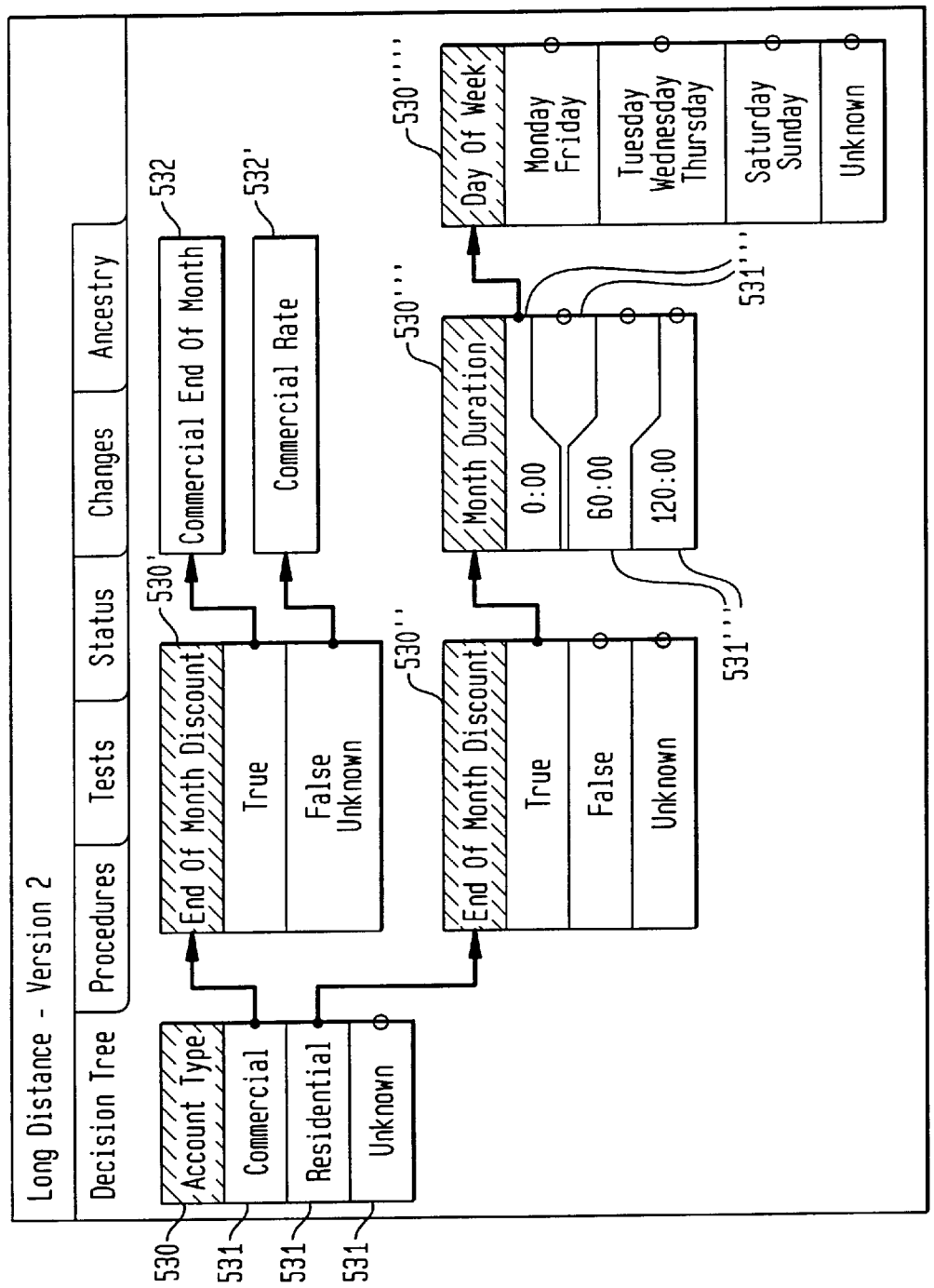
FIG. 8 illustrates an exemplary decision tree according to an embodiment of the present invention.

The usage type view of the rating editor 50 provides a decision tree editor which is, for example, a GUI in which the content can be created and modified by a user but the layout and display of the decision tree is automatically controlled. FIG. 8 illustrates an exemplary decision tree according to an embodiment of the present invention. A decision tree determines a single procedure to execute given any state of the possible input values. A decision tree contains a set of decision tree nodes only one of which is the root. A decision tree node can be, for example, either a procedure or a decision branch. A procedure defines, for example, an executable procedure to run, for example as indicated at procedure 532 named commercialEndOfMonth or procedure 532' named commercialRate on FIG. 8. A procedure can only be in the leaves of the decision tree. A decision branch is a place in a decision tree where a decision has to be made, for example as indicated at decision branch 530 named AccountType or 530' named endOfMonthDiscount in FIG. 8. A decision branch cannot be a leaf of a completed decision tree. Rather, a decision branch 530 contains, for example, a single decision test, a completeness indicator and a set of decision cases. There can be, for example, two kinds of decision branches: a symbol branch; and a range decision branch.

A decision test is a part of the decision branch that determines what is being branched on, for example the top slot of the decision branch 530 of FIG. 8 where "accountType" is the first branch. A decision test can permit, for example, either a single reference to an input variable, a function call referring to a set of input variables or arithmetic expression among input variables or function calls. A decision test can use, for example, the operators +, −, * and /. A decision case is a choice within a decision branch, for example shown as the slots 531 below the decision test slot in FIG. 8. Each decision case 531 defines, for example, a possible set of legal values within a decision branch (e.g., none of the decision cases in a decision branch overlap). A decision case connects to, for example, a single decision branch. A symbol decision branch can include, for example, an additional decision case labeled "unknown" which specifies that the decision test is unknown based on the state of input variables.

A symbol decision branch permits a variable to be compared to a static set of predefined symbols. For example, the accountType, endOfMonthDiscount and dayOfWeek decision branches, labeled 530, 530', 530" and 530''' respectively in FIG. 8, are examples of symbol decision branches. The decision cases for a symbol branch can be, for example, automatically generated based on the type returned by the decision test. For each type of different symbol there is an associated branch. The sets of different kinds of decision branches in this example include, for example, day decision branch, month decision branch and yes or no decision branch.

A range (e.g., scalar) decision branch is, for example, a decision branch which discriminates on a variable whose value may vary along a range. A range decision branch contains, for example, a set of boundaries along a range. Each boundary has a value which should be constant in a format that matches the decision test's type. Each boundary can also specify, for example, whether to use the case below it or above it when the input variable's value exactly matches the boundary. Using the example illustrated in FIG. 8, monthDuration decision branch 530''' is a range decision branch since monthDuration is a variable of type duration and the boundaries are labeled in <hour>< minute>notation. The branch has, for example, four decision cases 531'''': monthDuration≦0:00; 0:00<monthDuration<60:00; 60:00≦monthDuration<120:00; and monthDuration≧120:00. The set of different kinds of range decision branches may include, for example, number decision branch, percent decision branch, time decision branch, date decision branch, duration decision branch and currency decision branch.

The rating editor 50 includes, for example, a user interface for decision tree behavior so that, for example, mouse events, keystrokes and a variety of commands can initiate a variety of actions, such as selecting decision tree nodes or decision cases, initiating dialogs to add or modify a decision branch, a procedure or a boundary. For example, FIG. 9 illustrates an exemplary decision test dialog according to an embodiment of the present invention. For example, when an "add decision branch" action is taken via the rating editor 50, the exemplary decision test selection modal dialog illustrated in FIG. 9 could be displayed and provides, for example, a way to specify a decision test formula in terms of the set of input variables.

Figure 10:
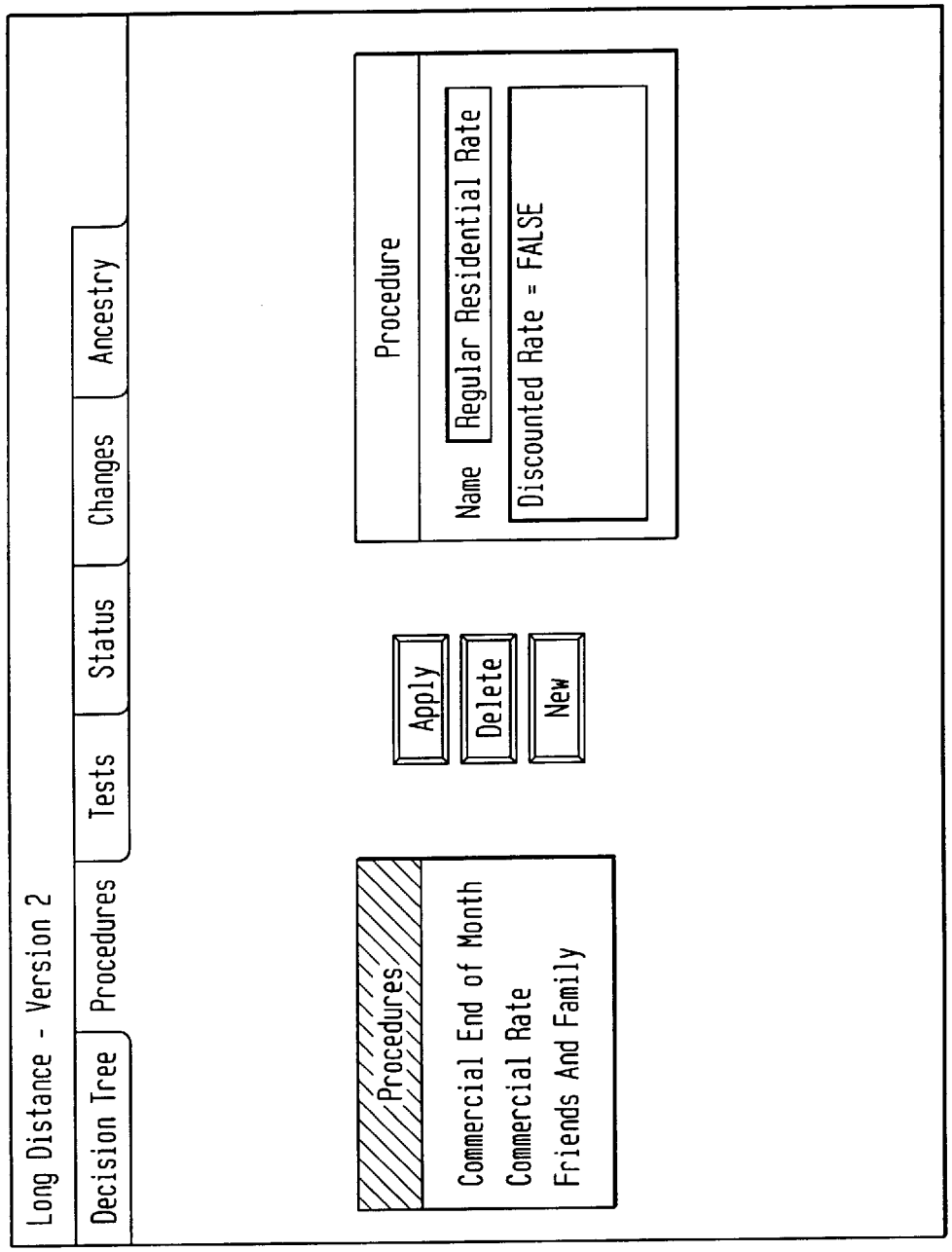
FIG. 10 illustrates an exemplary usage type view according to an embodiment of the present invention.

The rating editor 50 also provides, for example, a usage type view procedures tab, for example as illustrated in FIG. 10, that provides an interface for creating and editing procedures. A procedure has, for example, a name and a body. The procedure includes a set of assignment statements in a particular syntax, such as the Phoenician Procedure and Decision Test Language described earlier. The assignment statements define how to calculate a set of output variables and derived variables from the input variables. Since procedures can be referenced from a decision tree, the usage type view procedures tab, as shown in FIG. 10, could also be available as a dialog from the usage type view decision tree editor described above.

The rating editor 50 also includes, for example, a rate table view that provides an interface to each rate table stored in the rating database 10 for each rate provider and usage type as illustrated in FIG. 4. A rate table can be used to specify a mapping between, for example, four pre-defined variables and eight pre-defined parameters that are used by the rating engine 30 to compute a rate for a usage event. The four input variables include, for example: time period group; account type; rate group; and rateable component. The eight parameters include, for example: rating scheme; base rate; coefficient; threshold; unit of measure; round method; round to; and round point, although other variables could be used. The rate table view of the rating editor 50 provides the capability to, for example, create, view and edit a rate table, and could provide, for example, a spreadsheet interface for editing a rate table. In addition to creating a rate table, the rating editor 50 could also import a rate table, for example from an existing file that is inserted into the rate table. Similarly, a rate table could be exported and saved to a data file.

The rating domain server 20 includes an application programmers interface (API) that provides access to the persistent rating information stored in the rating database 10. In particular, the API can be used by the rating editor 50 to, for example, create, modify, delete and access rating information. All creation and updating of persistent rating information is through the rating domain server 20. The API of the rating domain server 20 can accept, for example, input values and return values of the following types: date (e.g., represents the year, month and dates); timeofday (e.g., represents a time of day); datetime (e.g., represents a point in time, including a date and time); duration (e.g., represents elapsed time); float (e.g., represents floating point numbers in the range of, for example, $2.2250738585072014\times10^{-308}$ to $1.7976931348623158\times10^{308}$ as specified in IEEE Standard 754); integer (e.g., represents whole numbers, for example in the range of 2,147,483,647 to −2,147,483,648); string (e.g., represents an ordered sequence of ISO Latin-1 characters using the ISO 646 encoding scheme); object (e.g., represents a reference to an object accessible via the API); enumeration (e.g., represents the value of a discrete type that can have one of a fixed number of values); any (e.g., represents any of the above types); and list (e.g., an ordered homogeneous sequence of values of the above types, such as objectlists, stringlists, and enumeration lists). In addition, a value of any type may be null, denoting, for example, that the value is unknown, not applicable, not defined or otherwise not representable. The rating domain server 20 can be implemented, for example as a Common Object Request Broker Architecture (CORBA) interface, thereby supporting remote access from the other components of the rating system.

Figure 11:
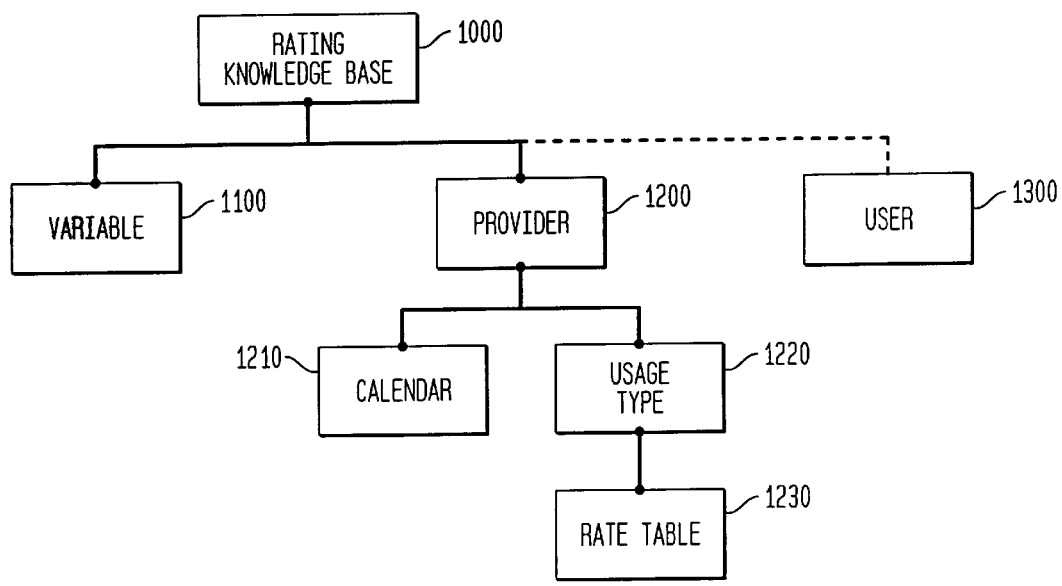
FIG. 11 illustrates an exemplary high level object model according to an embodiment of the present invention.

In the rating domain server 20, the RatingKnowledgebase object is, for example, the top level object in the system and contains all of the other rating objects. FIG. 11 illustrates an exemplary high level object model according to an embodiment of the present invention. For example, the RatingKnowledgebase object class 1000 is stored in the rating database 10 and represents the rating rules used by the rating engine 30. The objects that the RatingKnowledgebase object 1000 contains includes, for example, a Variable object 1100 and a Provider object 1200. The RatingKnowledgebase object 1000 may also contain a User object 1300. The Provider object 1200 can include, for example, a Calendar object 1210 and a UsageType object 1220 and the UsageType object 1230 may include a RateTable object 1220. A KnowledgebaseEntity object 1000 in the rating domain server 20 provides, for example, support for persistent storage of derived objects. All persistent objects in the rating database 10 can be derived from the KnowledgebaseEntity object 1000, such as decision tree nodes and branches, procedures and rates.

Users may have, for example, unique login identifications, full names, passwords and permissions as is known in the art. An API of the raing domain server 20 may maintain the User object for each active session. Each user may have none or more general permissions and none or more general provider permissions for each provider in the rating database 10. A general permission could include, for example, the authority to create and delete rate providers, create and delete users and create variable definitions. A provider permission would apply, for example, to a particular rate provider and include authority to, for example, examine contents of the rate provider and create and modify usage types, calendars or rate tables.

A variable is a named quantity in usage events that the rating engine 30 accesses for all of its usage inputs and outputs. A variable has, for example, a name, direction (e.g., input or output), a type, a description and an ID that identifies the variable in the usage event. For example, usage type decision trees and procedures discussed previously operate on input and output variables. The Variable object of the rating domain server 20 provides for the creation of new variables with a specified name, direction, type and ID.

Figure 12:
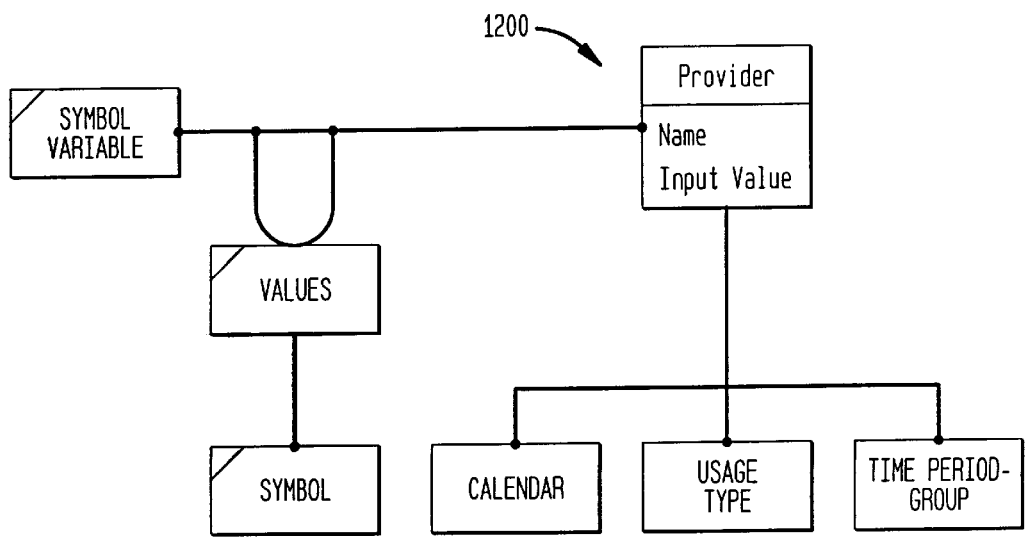
FIG. 12 illustrates an exemplary provider object model according to an embodiment of the present invention.

The Provider object of the rating domain server 20 represents, for example, the rate providers for whom usage rating is performed. A provider object may contain calendar and usage type rating rules as well as rate tables. In addition, a Provider object may contain the definitions of symbol values that symbolic input variables have in usage events for the rate provider. A Provider object also may contain the set of time period group definitions (e.g., day, evening, night) that the rate provider calendar time periods can reference. FIG. 12 illustrates an exemplary provider object model according to an embodiment of the present invention showing the relationship of subclasses of the Provider object class 1200 illustrated in FIG. 11.

A UsageType object of the rating domain server 20 contains, for example, the decision tree, rating procedures and rate table that collectively define all of the rating rules and data necessary to rate a given type of usage event.

Figure 13:
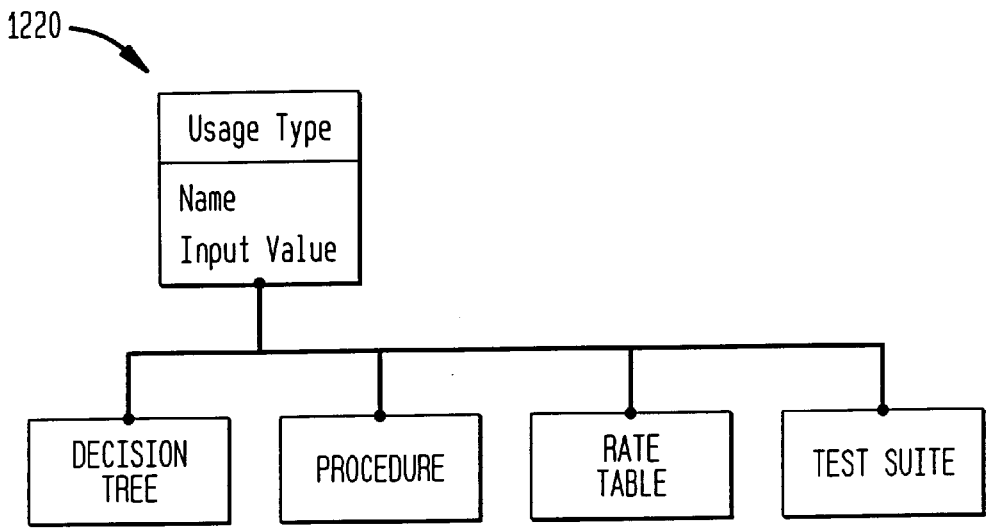
FIG. 13 illustrates an exemplary UsageType object model according to an embodiment of the present invention.
Figure 14:
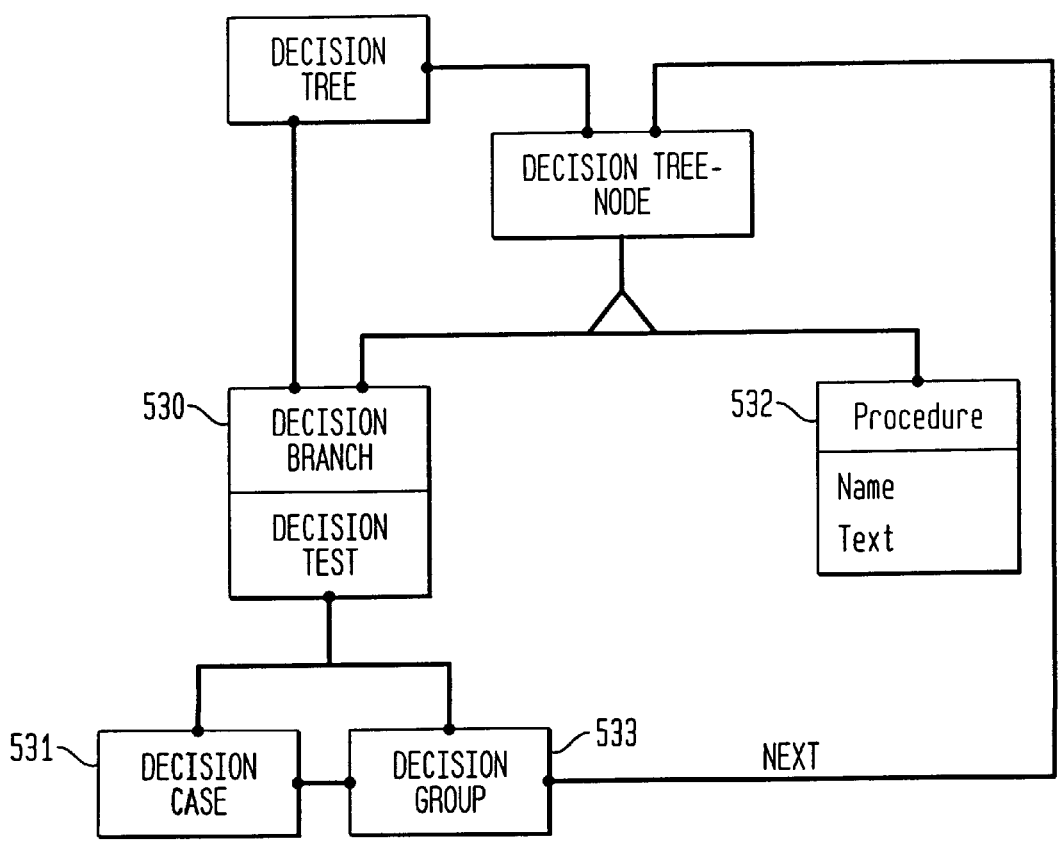
FIG. 14 is an exemplary decision tree object model according to an embodiment of the present invention.

Each UsageType is, for example, associated with a particular type of usage as identified in a usage event by the UsageType's "input value that forms a tag on the message for a usage event." FIG. 13 illustrates an exemplary UsageType object model according to an embodiment of the present invention showing the relationship of subclasses of the Usage type object class 1220 illustrated in FIG. 11. A usage type's decision tree, for example as shown in FIG. 13 and in more detail in FIG. 14, is an acyclic graph of connected decision branches.

The decision tree begins with a root decision branch that connects, for example, to two or more decision branches 530 and so on until termination at the tree's leaves, each of which is a reference to a rating procedure 532 as explained with regard to FIG. 8. A procedure reference is, for example, a leaf in the decision tree that specifies the rating procedure associated with the criteria leading to the leaf node. A rating procedure defines the set of calculations and output variable assignments to perform for a given terminal case in the decision tree. Each decision branch 530 contains a decision test, which is an expression involving input variables, and a set of cases 531 that collectively represent the possible values of the decision test's expression. Cases 531 can be grouped into sets of one or more cases and each group of cases 533 can be connected to the next decision node, which is either another decision branch 530 or a procedure reference 532. Also as discussed regarding FIG. 8, decision branches 530 can either be discrete decision branches, meaning for example that the decision test yields a single symbolic value from a defined set of values, or are scalar decision branches, meaning for example that the decision branch yields a single numeric or otherwise scalar value from a contiguous range of values.

A case 531 within the rating system according to the present invention is for example, defined within a usage type and includes a name (unique to the usage type), a series of Boolean expressions forming a test condition and a series of assignments forming the action part of the case 531. Set forth below is an exemplary case 531 and an exemplary table of case functions that are available in a case 531.

```
CASE reachOutAmerica
BEGIN
   CALENDAR: calendar1
IF (?AccumulateQuantityorDetettnineRateAmount = "Determine Rate
Amount")AND
   timeOfDay(?adjustedTime1) >= 18:00 AND
   timeOfDay(?adjustedTime1) < 23:00
THEN
   [?rateID, ?ratingScheme, ?unitOfMeasurement, ?unitsPerRate]
=
   getFirstTimePeriodCalendarRate (?calendar1, ?adjustedTime1,
                  ?quantity, ?rateGroup1);
   ?thisTimeDuration = ceiling (getUnits (?Duration1,
                        ?unitOfMeasurement));
   ?amount = getAmountCharged (?rateID,
ceiling ((?thisTimeDuration/
?unitsPerRate)));
   ?amount = ?amount * 0.70;
END CASE
CASE reachOutAmericaComplex
BEGIN
   CALENDAR: calendar1
IF (?AccumulateQuantityOrDetermineRateAmount = "Determine Rate
Amount") AND
   ((timeofDay (?adjustedTime1) >= 06:00 AND
   timeofDay (?adjustedTime1) < 08:00) OR
   (timeofDay (?adjustedTime1) >= 18:00 AND
   timeofDay (?adjustedTime1) < 23:00))
THEN
   ?remainingDuration = ?Duration1;
   FOR EACH IN [?rateID, ?ratingScheme, ?unitOfMeasurement,
?unitsPerRate) =
                  getAllTimePeriodCalendarRate (?calendar1,
?adjustedTime1
                     ?quantity,
?rateGroup1)
   DO
   BEGIN
      [?thisTimeDuration, ?remainingDuration] =
                  getThisDuration (?rateID,
?remainingDuration);
                  ?thisTimeDurationUnits =
ceiling(getUnits(?thisTimeDuration,
?unitOfMeasurement));
      ?amount = ?amount +
               getAmountcharged (?rateID,
   ceiling((?thisTimeDurationUnits/
   ?unitsPerRate)),
                     (?Duration1 -
?remainingDuration);
   END DO
   ?amount = ?amount * 0.70;
END CASE
```

| Function | Description |
| --- | --- |
| +, −, *, /, module, remainder | Standard arithmetic operators for numbers, dates, times, and date/times. |
| = | Assignment operator to derived or output variables. |
| ==, != | Equality and inequality operators for numbers, dates, times, date/times, and strings. |
| >, >=, <, <= | Standard arithmetic comparison for numbers, dates, times, and date/times. |
| Abs | Returns the absolute value of a number. |
| and, or, not | Standard Boolean operators. |
| CaseName | Returns the name of the current case. |
| Ceiling | Returns the least integral value greater than or equal to the number passed in. |
| DateOfDateTime | Get the date portion of a date/time. |
| DayOfDateTime | Get the day portion of a date/time. |
| DayOfWeek | Get the day of the week from a date/time. |
| Floor | Returns the greatest integral value less than or equal to the number passed in. |
| GetAllTimePeriodCalendarRate | Get all the applicable rates from the rate table. |
| GetAmountCharged | Get the amount charged based upon a quantity and the previous quantity, if any. |
| GetFirstTimePeriodCalendarRate | Get the first applicable rate from the rate table when the usage event went off-hook. |
| GetLastTimePeriodCalendarRate | Get the first applicable rate from the rate table |

-continued

| | |
|---|---|
| | when the usage event went on-hook. |
| GetThisDuration | Gets the amount of duration for this time period based upon the remaining duration to rate. |
| GetUnits | Get the number of units based upon the duration, the input unit of measurement; and the rate table unit of measurement. |
| HasTagValue | Determine whether the input tag had a value passed in with the usage event. |
| HourOfDatetime | Get the hour portion of a date/time. |
| IsTagDefined | Determine whether the input tag was in the usage event. |
| Max | Returns the maximum of two numbers. |
| Min | Returns the minimum of two numbers. |
| MinuteOffDateTime | Get the minute portion of a date/time. |
| MonthOffDateTime | Get the month portion of a date/time. |
| RoundDown | Rounds to the nearest integral value with a fractional amount greater than 0.50 using ceiling and a fractional amount of 0.50 or less using floor. |
| Roundup | Rounds to the nearest integral value with a fractional amount of 0.50 or greater using ceiling and a fractional amoun less than 0.50 using floor. |
| RoundWithRoundPoint | Rounds to the high or low integral value passed into the function based upon the rounding point which is also passed in. |
| secondOfDateTime | Get the second portion of a date/time. |
| TimeOfDateTime | Get the time portion of a date/time. |
| YearOfDateTime | Get the year portion of a date/time. |

Each Boolean expression in the exemplary case 531 set forth can potentially be evaluated in parallel as there cannot be any side effects to their evaluation. The rating engine is also allowed to evaluate a Boolean once per rating of an instance of a usage type and cache the results. The behavior of the rating engine 30 when a Boolean expression has a side effect is not specified. The expression can return a number or a string. A function is also allowed to return a sequence of numbers, for example, all the rates that are applicable during the telephony usage. The only looping construct in the rule language is a for each construct which takes a sequence and pulls out one element at a time. This is typically used to sum the results. The derived action part(s) of the case 531 should occur serially as derived variables may be determined from other derived variables that have previously been assigned values. The output action part(s) of the case 531 may be evaluated in parallel as output variables cannot be derived from other output variables. The variables that can be defined within a case are the derived variables.

As shown in FIG. 14, each group of cases 533 in a decision tree is connected to a DecisionTreeNode, which may be, for example, either a DecisionBranch 530 or a ProcedureReference 532. The DecisionBranch class is the base class for the two different kinds of decision branches— DiscreteDecisionBranch and ScalarDecisionBranch. DiscreteDecisionBranches have a fixed number of cases equal to, for example, the number of predefined discrete values of the decision test plus, for example, one for an "unknown" case. For example, if the type of decision test is symbol, then each case has an associated symbol value. If the decision test type is boolean, then each case has an associated boolean value. ScalarDecisionBranches have a variable number of cases separated by boundaries. Each boundary has an associated value appropriate to the domain of the of the decision test type. The cases are, for example, automatically sorted in ascending order according to their associated boundary values as the cases are created. Because there may be no boundary associated with an unknown case, the lower boundary of the first case may be presumed to be the smallest possible value in the domain and the last case may have no associated upper boundary since its upper boundary is presumed to be the largest possible value in the domain, there may be two fewer boundaries than there are cases.

Thus, according to an embodiment of the present invention, a decision branch 530 contains the decision test expression, a set of cases 531 (e.g., each of which represents a possible value or range of values for the decision test) and a set of case groups 533 each with reference to the next decision node that the group of cases is associated with. Cases 531 are maintained, for example, as an ordered sequence of cases, the order being determined by, for example, the associated values depending on the type of decision branch. Groups 533 can also be maintained as an ordered sequence of groups and the rating editor 50 can use the order to, for example, determine the decision tree graphical layout. A decision group 533 should contain at least one decision case 531. A decisionCase is the base class for three different kinds of decision cases: DiscreteDecisionCase; ScalarDecisionCase; and UnknownDecisionCase. DiscreteDecisionCases have, for example, an associated value which may be either a boolean value or a symbol value. Each ScalarDecisionCase represents, for example, a range of values between its lower boundary and its upper boundary. The cases are, for example, automatically sorted in ascending order to their associated boundary values as the cases are created. Boundaries are used to divide domains into ranges and each boundary is associated with, for example, two ScalarDecisionCases.

In contrast to the present invention, conventional decision tree tools only provide for discrete decision branches, even to implement a scalar rule. While such a decision tree tool may traverse to the proper decision case, the discrete decision branch may result in an illogical output (e.g., a discrete decision branch may provide for two discrete conditions but receive a value between the two discrete conditions thus causing an illogical output) and thus does not provide the complete solution of a scalar decision branch as provided according to an embodiment of the present invention (e.g., as implemented via a scalar algorithm used in defining a decision tree).

Figure 15:
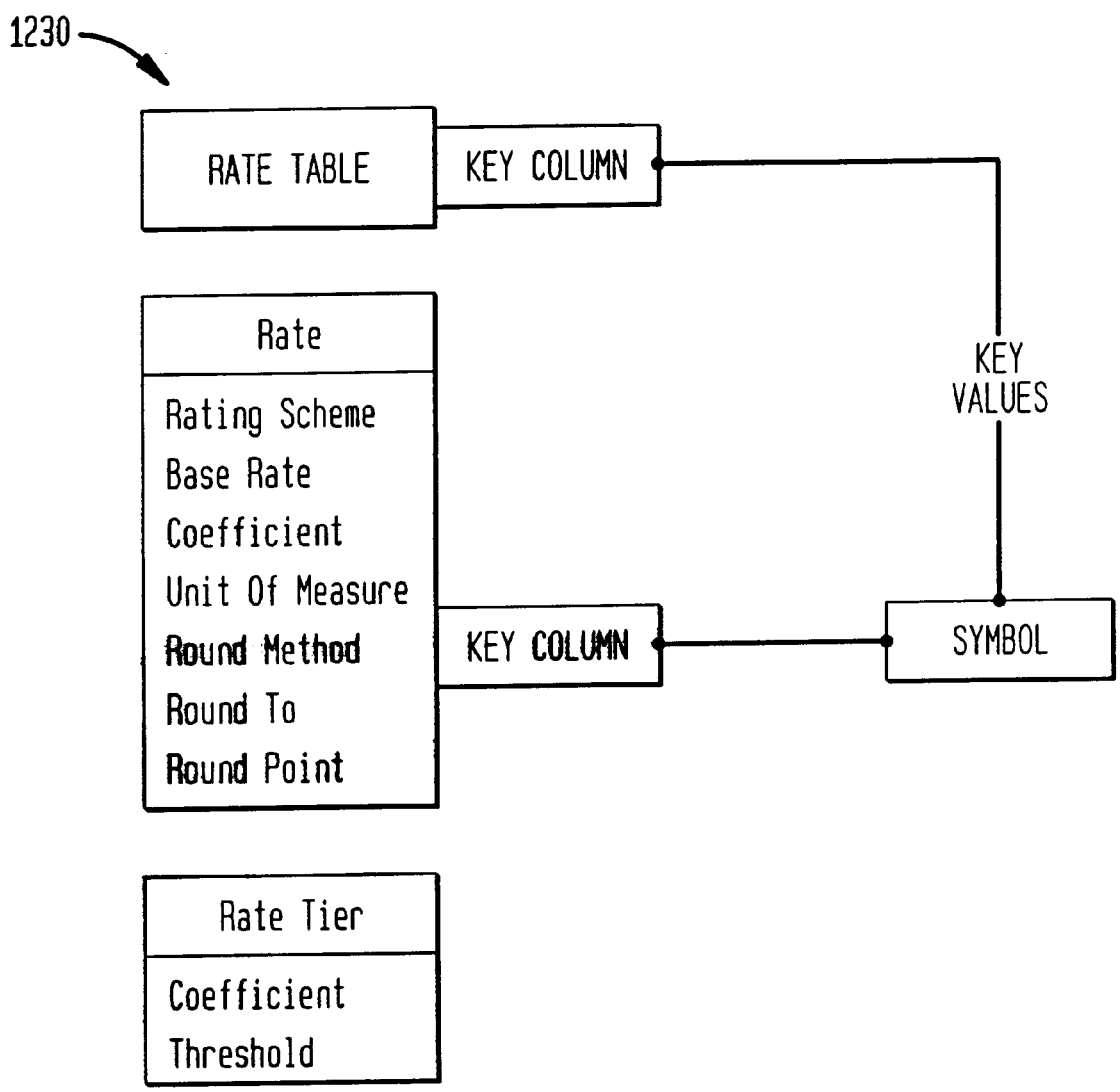
FIG. 15 shows an exemplary RateTable object model according to an embodiment of the present invention.

A rate table is a table of rates stored in the rating database 10 with each row of the table corresponding to, for example, a single rate and may have a format as illustrated in FIG. 4. Rates exist within a usage type for a rate provider. The columns of the rate table can, for example, correspond to the keys that define the conditions for which a particular rate applies plus the values that define the rate itself [?] As described earlier with regard to the rate table view of the rating editor 50, individual rates can be uniquely identified by four discrete key values in, for example, columns Time Period Group, Account Type, Rate Group and Rateable Component. An API of the rating domain server 20 automatically creates the individual rates when the possible symbol values for each key column are defined via the rating editor 50. FIG. 15 shows an exemplary RateTable object model according to an embodiment of the present invention showing the relationship of subclasses of the RateTable object 1230 illustrated in FIG. 11.

Each individual rate has, for example, also as previously described with regard to the rating view of the rating editor 50, a rating scheme, a unit of measurement, a base rate (e.g., cost per rated unit), a coefficient (e.g., base rate multiplier), a rounding method, a rounding-to value and a rounding point. The rounding-to value defines, for example, the resolution of the rounding. The rounding point defines the breaking point between two values. A rate may also have a rating scheme that involves two or more tiers, in which case different rating coefficients apply. For example, a rate tier defines a rating coefficient for the tier as well as a threshold of usage at and above which the tier is applicable until superseded by a tier with a higher threshold of usage.

Figure 16:
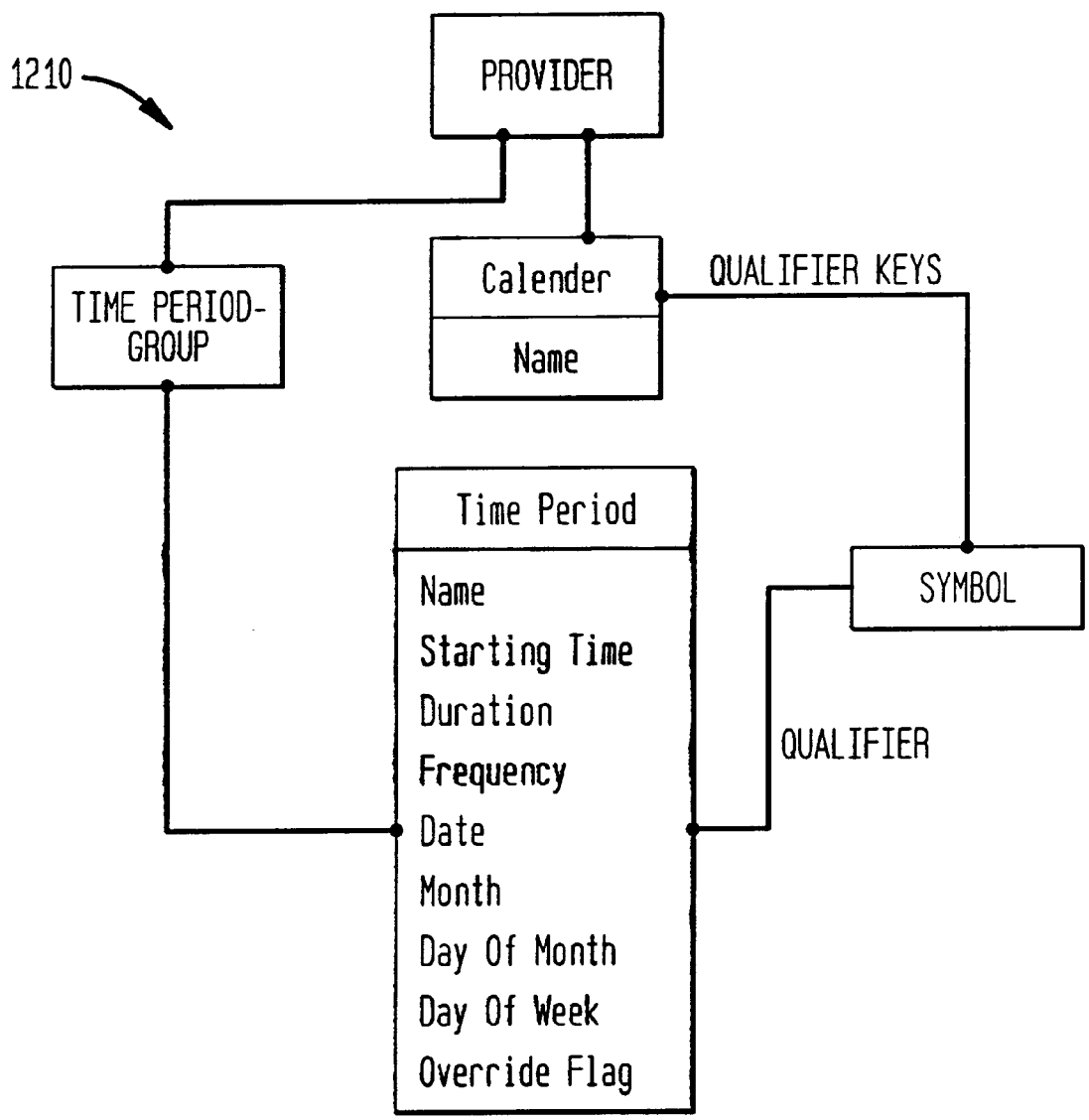
FIG. 16 illustrates an exemplary calendar object model according to an embodiment of the present invention.

A calendar is a set of time periods which, for example, collectively associate every point in time within the calendar's effective dates with a specific time period group symbol to be used when looking rates up in the rate tables. Time periods may, for example, be defined as being applicable only for a certain type of customer, e.g., customers who are "senior citizens" may receive night rates beginning at 1600 rather than at a later time defined for other customers. FIG. 16 illustrates an exemplary calendar object model according to an embodiment of the present invention showing the relationship of the subclasses of Calendar object 1210 illustrated in FIG. 11. A calendar time period defines a set of common attributes for one or more periods of time. Time periods may be, for example, singular or recurring. If they are recurring, then they may be specified as, for example, recurring daily, weekly, monthly or annually.

The rating monitor 60 includes, for example, a simple GUI application running on a personal computer that provides a human interface for the rating supervisor 40. The rating supervisor 40 can, for example, start, stop, monitor and provide information about the status of the rating subsystem.

In operation, the rating engine 30 according to the present invention operates as follows. A usage author, e.g., a person controlling the use of the rating engine 30, writes rating subsystem procedures and decision tests. Procedures are what the usage author writes to rate a usage event. Procedures contain a series of assignments to output variables and derived values and are created and modified using the rating editor 50 GUI. When the rating engine 30 receives a usage event from the queue manager 70, the rating engine 30 runs through the decision tree for the usage type to determine the procedure to execute. During the course of evaluating a branch in the decision tree, a decision test may be evaluated. A decision test is an arithmetic expression used to branch within the decision tree. Finally, a procedure to execute is found. The rating engine 30 will then evaluate the assignment statement in the procedure. Output values will then be appended as tags onto the usage event message.

An example of the operation of the usage event rating system according to the present invention is as follows. In the example, usage events for a customer of a long distance telephone service provider are rated by a rating system according to the present invention. Rates for calls could be obtained, for example, from tariffs filed by the long distance service provider with the Federal Communications Commission, while other values, such as calendars, rounding schemes and discount plans would be determined by the carrier and could vary among different customers of the carrier. In this example, it is assumed that all partial minutes are rounded up and all rate amounts are rounded up as well. A calendar for residential and commercial customers could be as set forth in Tables 4 and 5 below.

TABLE 4

Residential Calendar

| Time Period | Time Period Group | Time Period Type | Start Time | Duration |
| --- | --- | --- | --- | --- |
| Day | Day | Daily | 08:00:00 | 08:59:59 |
| Evening | Evening | Daily | 17:00:00 | 05:59:59 |
| Night | Night/Weekend | Daily | 23:00:00 | 00:59:59 |
| Morning | Night/Weekend | Daily | 00:00.00 | 07:59:59 |
| Saturday | Night/Weekend | Weekly | 00:00:00 | 23:59:59 |
| Sunday | Night/Weekend | Weekly | 08:00:00 | 08:59:59 |

TABLE 5

Commercial Calendar

| Time Period | Time Period Group | Time Period Type | Start Time | Duration |
| --- | --- | --- | --- | --- |
| Peak | Peak | Daily | 08:00:00 | 08:59:59 |
| Morning | Off-Peak | Daily | 00:00:00 | 07:59:59 |
| Evening | Off-Peak | Daily | 17:00:00 | 06:59:59 |
| Saturday | Off-Peak | Weekly | 00:00:00 | 23:59:59 |
| Sunday | Off-Peak | Weekly | 00:00:00 | 08:59:59 |

Rate groups can be based on, for example, the mileages of a call, such as the mileage designations set forth by the Federal Communications Commission. Thus, in the example the rate groups could be: RM1__10; RM11__22; RM23__55; RM56__124; RM125__292; RM293__430; RM431__925; RM926__1910; RM1911__3000; RM3001__4250; and RM4251__5750. The account types for this example would be residential and commercial. Accordingly, the rate table for this example is set forth in Table 6 below and would be stored in the rating database 10.

TABLE 6

| Time Period Group | Rate Group | Account Type | Rating Scheme | Base Rate | Add'l Rate | Unit of Measurement |
|---|---|---|---|---|---|---|
| Day | RM1_10 | Residential | Flat | 0.2499 | | Minute |
| Day | RM11_22 | Residential | Flat | 0.2599 | | Minute |
| Day | RM23_55 | Residential | Flat | 0.2699 | | Minute |
| Day | RM56_124 | Residential | Flat | 0.2699 | | Minute |
| Day | RM125_292 | Residential | Flat | 0.2799 | | Minute |
| Day | RM293_430 | Residential | Flat | 0.2799 | | Minute |
| Day | RM431_925 | Residential | Flat | 0.2799 | | Minute |
| Day | RM926_1910 | Residential | Flat | 0.2799 | | Minute |
| Day | RM1911_3000 | Residential | Flat | 0.2999 | | Minute |
| Day | RM3001_4250 | Residential | Flat | 0.3199 | | Minute |
| Day | RM4251_5750 | Residential | Flat | 0.3499 | | Minute |
| Evening | RM1_10 | Residential | Flat | 0.1399 | | Minute |
| Evening | RM11_22 | Residential | Flat | 0.1499 | | Minute |
| Evening | RM23_55 | Residential | Flat | 0.1599 | | Minute |
| Evening | RM56_124 | Residential | Flat | 0.1599 | | Minute |
| Evening | RM125_292 | Residential | Flat | 0.1599 | | Minute |
| Evening | RM293_430 | Residential | Flat | 0.1799 | | Minute |
| Evening | RM431_925 | Residential | Flat | 0.1799 | | Minute |
| Evening | RM926_1910 | Residential | Flat | 0.1799 | | Minute |
| Evening | RM1911_3000 | Residential | Flat | 0.1799 | | Minute |
| Evening | RM3001_4250 | Residential | Flat | 0.2199 | | Minute |
| Evening | RM4251_5750 | Residential | Flat | 0.2299 | | Minute |
| Nt/wknd | RM1_10 | Residential | Flat | 0.1199 | | Minute |
| Nt/wknd | RM11_22 | Residential | Flat | 0.1299 | | Minute |
| Nt/wknd | RM23_55 | Residential | Flat | 0.1299 | | Minute |
| Nt/wknd | RM56_124 | Residential | Flat | 0.1399 | | Minute |
| Nt/wknd | RM125_292 | Residential | Flat | 0.1399 | | Minute |
| Nt/wknd | RM293_430 | Residential | Flat | 0.1399 | | Minute |
| Nt/wknd | RM431_925 | Residential | Flat | 0.1499 | | Minute |
| Nt/wknd | RM926_1910 | Residential | Flat | 0.1499 | | Minute |
| Nt/wknd | RM1911_3000 | Residential | Flat | 0.1599 | | Minute |
| Nt/wknd | RM3601_4250 | Residential | Flat | 0.1699 | | Minute |
| Nt/wknd | RM4251_5750 | Residential | Flat | 0.1699 | | Minute |
| Peak | RM1_10 | Commerc'l | Tiered | 0.2853 | 0.2957 | Minute |
| Peak | RM11_22 | Commerc'l | Tiered | 0.2853 | 0.2957 | Minute |
| Peak | RM23_55 | Commerc'l | Tiered | 0.2853 | 0.2957 | Minute |
| Peak | RM56_124 | Commerc'l | Tiered | 0.3087 | 0.3191 | Minute |
| Peak | RM125_292 | Commerc'l | Tiered | 0.3087 | 0.3191 | Minute |
| Peak | RM293_430 | Commerc'l | Tiered | 0.3087 | 0.3191 | Minute |
| Peak | RM431_925 | Commerc'l | Tiered | 0.3087 | 0.3191 | Minute |
| Peak | RM926_1910 | Commerc'l | Tiered | 0.3288 | 0.3342 | Minute |
| Peak | RM1911_3000 | Commerc'l | Tiered | 0.3288 | 0.3342 | Minute |
| Peak | RM3001_4250 | Commerc'l | Tiered | 0.3734 | 0.3838 | Minute |
| Peak | RM4251_5750 | Commerc'l | Tiered | 0.4077 | 0.4181 | Minute |
| Off-Pk | RM1_10 | Commerc'l | Tiered | 0.1781 | 0.1885 | Minute |
| Off-Pk | RM11_22 | Commerc'l | Tiered | 0.1781 | 0.1885 | Minute |
| Off-Pk | RM23_55 | Commerc'l | Tiered | 0.1781 | 0.1885 | Minute |
| Off-Pk | RM56_124 | Commerc'l | Tiered | 0.1887 | 0.2000 | Minute |
| Off-Pk | RM125_292 | Commerc'l | Tiered | 0.1887 | 0.2000 | Minute |
| Off-Pk | RM293_430 | Commerc'l | Tiered | 0.1887 | 0.2009 | Minute |
| Off-Pk | RM431_925 | Commerc'l | Tiered | 0.1887 | 0.2000 | Minute |
| Off-Pk | RM926_1910 | Commerc'l | Tiered | 0.1894 | 0.2088 | Minute |
| Off-Pk | RM1911_3000 | Commerc'l | Tiered | 0.1894 | 0.2088 | Minute |
| Off-Pk | RM3001_4250 | Commerc'l | Tiered | 0.2593 | 0.2697 | Minute |
| Off-Pk | RM4251_5750 | Commerc'l | Tiered | 0.2707 | 0.2811 | Minute |

Additional values necessary to complete the rate are set forth in Table 7 and would be stored in the rating database 10.

TABLE 7

| Variable | Value |
|---|---|
| Rounding Direction | RoundUp |
| Units per Base Rate | 1 |
| Base Coefficient | 1.0 |
| Units per Additional Rate | 1 |
| Additional Rate Coefficient | 1.0 |

In order to create the cases, the following system-defined variables, illustrated in FIG. 6, are used: accountType; adjustedTime; amount; baseAmount; discountAmount; duration; and rateGroup. Also, the usage type variables set forth in Table 8 are defined via the rating editor 50 and used to create the cases used in the decision tree defined for the usage type stored in the rating database 10.

TABLE 8

| Variable | Input/Output | Type | Description | Usage Type Required |
|---|---|---|---|---|
| calledPartyMCICustomer | Input | Boolean | whether the called party was also an MCI customer or not | Optional |
| discountedRate | Output | Boolean | whether the customer qualified for the discount plan this month | Optional |
| endOfMonthDiscount | Input | Boolean | whether this usage event is being rated with end of month discounting or not | Optional |
| monthDuration | Input | Duration | the duration of calls that the customer made this month | Optional |
| ocp | Input | Symbol | the optional calling plan of the customer (e.g., 'friendsAndFamily') | Optional |
| previousCallsDuration | Input | Duration | the previous duration of cals that the customer made this month | Optional |

Figure 17A:
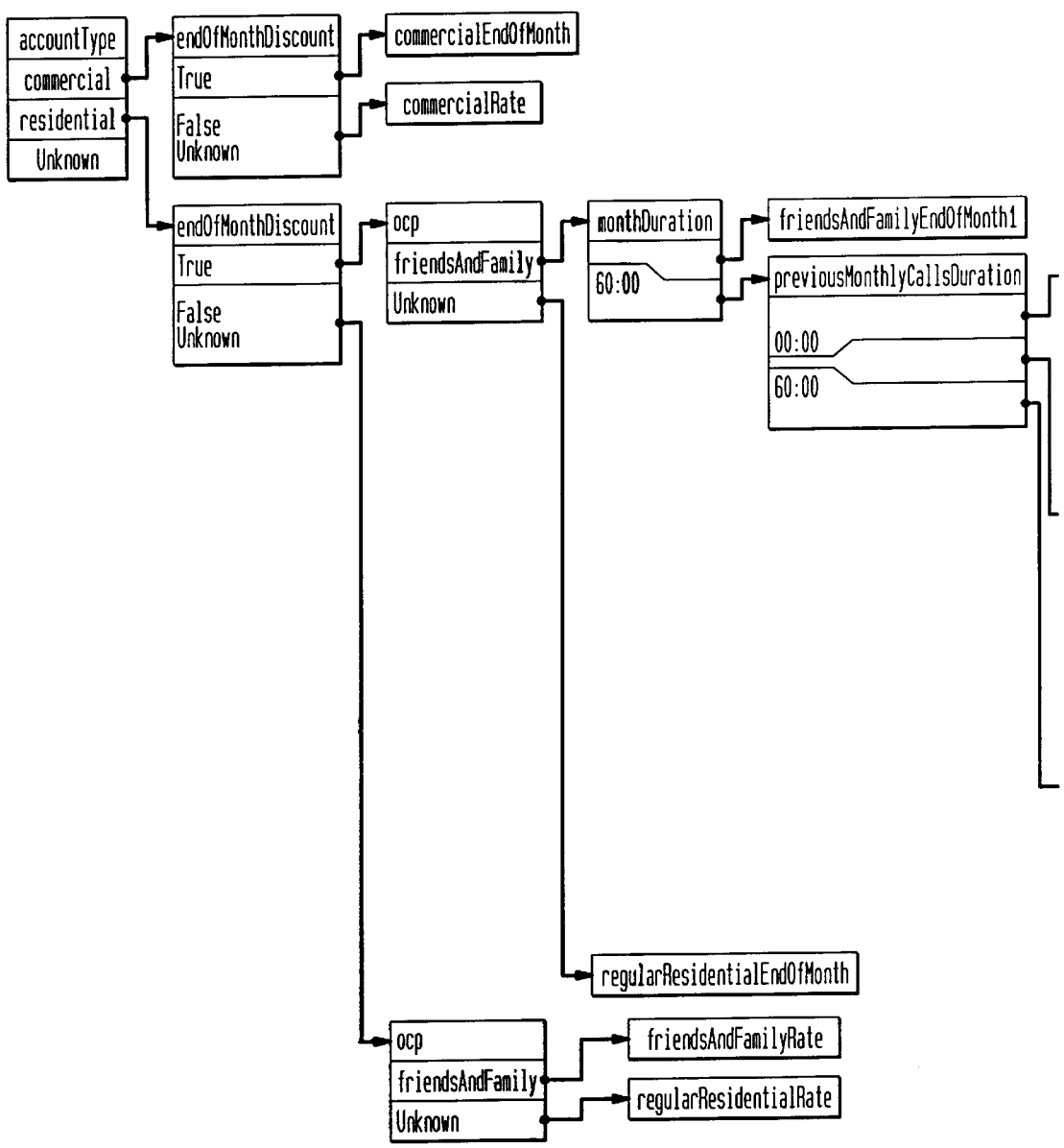
FIG. 17 illustrates an exemplary usage decision tree according to an embodiment of the present invention.
Figure 17B:
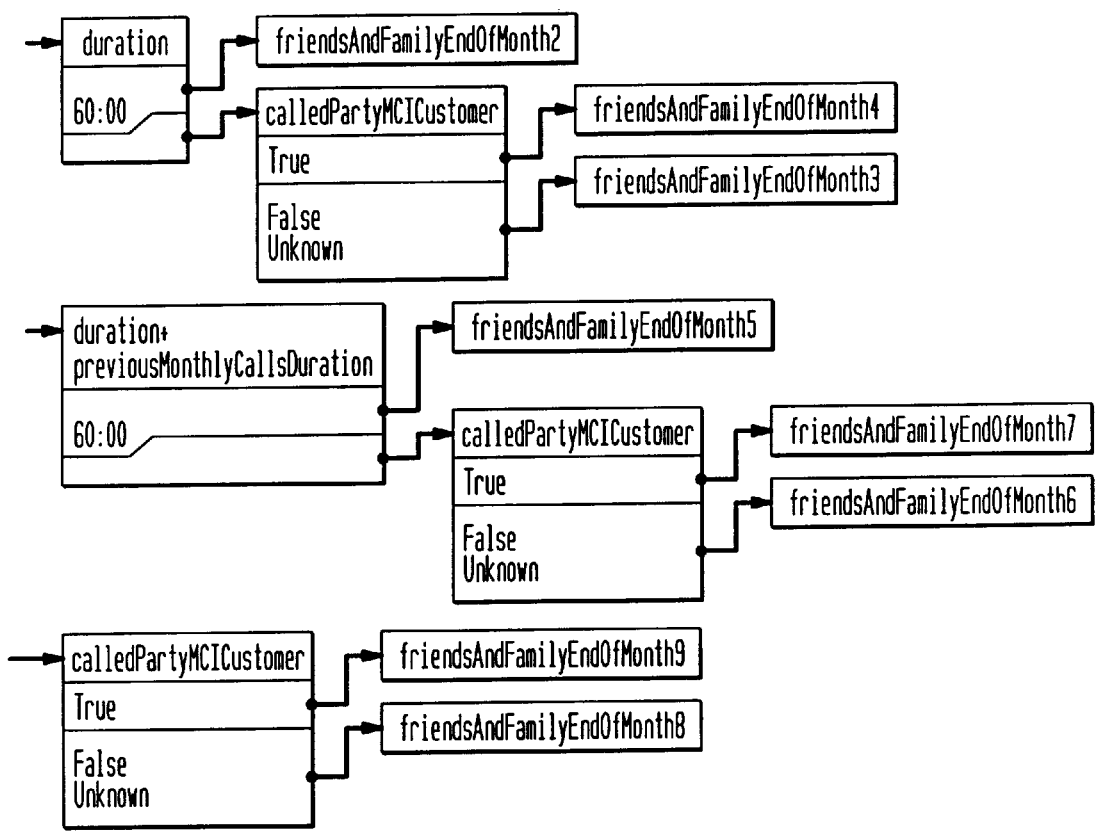

The decision tree implementing the commercial and residential rating for the long distance provider,. such as MCI in this example, is illustrated in FIG. 17. Exemplary usage procedures invoked by the decision tree illustrated in FIG. 17 are shown below as pseudocode.

```
//Commercial Rating
PROCEDURE cornrnercialRate
    adjTimePeriodGroup = getAdjacentTimePeriodGroups ('commercialCalendar',
    adjustedTime duration);
    rateGroupID =
        getTimePeriodGroupCalendarRates(adjTimePeriodGroup, rateGroup,
    accountType);
    amount getMultipleTimePeriodAmountCharged(adjTimePeriodGroup,
        rateGroupD);
    amount = round(amount1, 2);
// The assumption here is that the run-time rating engine will receive all
// of the usage events back a second time at the end of the month and
// will need to distinguish whether discounting applies. Here it does not.
    PROCEDURE commerciathndOfMonth
        discountedRate = FALSE;
// Regular rating for Friends and Family
    PROCEDURE friendsAndFamilyRate
        adjTimePeriodGroup = getAdjacentTimePeriodGroups('residentiaiCalendar',
        adjustedTime, duration);
        rateGroupID
            = getTimePeriodGroupCalendarRates(adjTimePeriodGroup, rateGroup,
        accountType);
        amount1 = getMultipleTimePeriodAmountCharged(adjTimePeriodGroup,
        rateGroupID);
            baseAmount = round(amount1, 2);
// Regular rating for non-OCP customers
    PROCEDURE regularResidentialRate
        adjTimePeriodGroup = getAdjacentTimePeriodGroups('residentialCalendar',
        adjustedTime, duration);
        rateGroupID
            =getTimePeriodGroupCalendarRates(adjTimePeriodGroup, rateGroup,
        accountType);
        amount1 = getMuitipleTimePeriodAmountCharged(adjTimePeriodGroup,
        rateGroupID);
        amount = round(amount1, 2);
// The assumption hereis that the run-time rating engine will receive all
// of the usage events back a second time at the end of the month and
// will need to distinguish whether discounting applies. Here it does not.
    PROCEDURE regularResidentialEndOfMonth
        discountedRate ==FALSE;
// The remaining procedures below are to handie the ed of month discounting.
// In this procedure, the customer did not use 60 minutes of long distance this
// month and therefore is ineligible for the discount.
    PROCEDURE friendsAndFamilyEndOfMonth1
        discountAmount = baseAmount;
        discountRate = FALSE;
```

-continued

```
// In this procedure, this was the customer's first call of the month, its
// duration is less than 60 minutes, and the customer did not use 60 minutes
// of long distance.
// Charge them $10.00.
   PROCEDURE friendsAndFamilyEndOfMonth2
      discountAmount = 10.00;
      discountedRate = TRUE;
// In this procedure, this was the custorner's first call of the month, its
// duration is greater than 60 minutes, and this was to a non-MCI customer.
// Charge them $10.00 and the regular MCI rate for the duration of the call
// over the 60 minutes.
   PROCEDURE friendsAndFamilyEndOfMonth3
      adjTimePeriodGroup = getAdjacentTimePeriodGroups('residentialCalendar',
      (adjustedTime + 60:00),
      (duration − 60:00));
      rateGroupID
         = getTimePeriodGroupCaiendarRates(adjTimePeriodGroup, rateGroup,
                        acountType);
      amount1 = getMultipleTimePeriodAmountCharged(adjTimePeriodGroup,
   rateGroupID, TRUE, 60:00);
      discountAmount = 10.00 + round(amount1, 2);
      discountedRate = TRUE;
// In this procedure, this was the customer's first call of the month, its
// duration is greater than 60 minutes, and this was to a MCI customer
// Charge them $10.00 and half the regular MCI rate for the duration of
// the call over the 60 minutes.
   PROCEDURE friendsAndFamilyEndOfMonth4
      adjTimePeriodGroup = getAdjacentTimePeriodGroups('residentialCalendar',
      (adjustedTime + 60:00),
      (duration − 60:00));
      rateGroupID
         = getTimePeriodGroupCalendarRates(adjTimePeriodGroup, rateGroup,
   accountType);
      amount1 = getMultipleTimePeriodAmountCharged(adjTimePeriodGroup,
   rateGroupID, TRUE, 60:00);
      discountAmount = 10.00 + round((amount1 * 50%), 2);
      discountedRate = TRUE;
// In this procedure, this was the NOT customer's first call of the month, the
// previous calls did not add up to 60 minutes yet and the previous calls
// plus this one do not yet add up to 60 minutes.
// Charge the customer nothing.
   PROCEDURE friendsAndFamilyEndOfMonth5
      discountAmount = 0.00;
      discountRate = TRUE;
// In this procedure, this was the NOT customer's first call of the month, the
// previous calls did not add up to 60 minutes yet, the previous calls
// plus this one do add up to over 60 minutes, and this was to a non-MCI
// customer.
// Charge the customer the regular MCI rate for the duration of
// the call over the 60 minutes.
   PROCEDURE friendsAndFamilyEndOfMonth6
      discountDuation = duration + previousMonthlyCallsDuration − 60:00;
      discountStartTime = adjustedTime + 60:00 − previousMonthlyCallsDuration;
      adjTimePeriodGroup
         = getAdjacentTimePeriodGroups('residentialCalendar', discountStartTime,
                        discountDuration);
      rateGroupID
         = getTimePeriodGroupCalendarRates(adjTimePeriodGroup; rateGroup,
   accountType);
      amount1
         = get MultipleTimePeriodAmountCharged(adjTimePeriodGroup,
                        rateGroupID, TRUE,
                        (duration - discountDuration));
      discountAmount = round(amount1, 2);
      discountRate = TRUE;
// In this procedure, this was the NOT customer's first call of the month, the
// previous calls did not add up to 60 minutes yet, the previous calls
// plus this one do add up to 60 minutes yet the previous calls
// plus this one do add up to over 60 minutes, and this was to a MCI customer.
// Charge the customer half the regular MCI rate for the duration of
// the call over the 60 minutes.
   PROCEDURE friendsAndFamilyEndOfMonth7
      discountDuration = duration + previousMonthlyCallsDuration 60:00;
      discountStartTime = adjustedTime + 60:0 − previousMonthlyCallsDuration;
      adjTimePeriodGroup
         = getAdjacentTimePeriodGroups('residentialCalendar', discountStartTime,
                  discountDuration);
      rateGroupID
         = getTimePeriodGroupCalendarRates(adjTimePeriodGroup, rateGroup,
```

-continued

```
            accountType);
    amount1
        = getMultipleTimePeriodAmountCharged(adjTimePeriodGroup,
                        rateGroupID, TRUE,
                        (duration - discountDuration));
    discouutAmount = round((amount1 * 50%), 2);
    discountRate = TRUE;
// In this procedure, the previous calls added up to over 60 minutes and this was
// to a non-MCI customer.
// Since the base amount was already determined, then charge the customer for this.
    PROCEDURE friendsAndFamilyEndOfMonth8
        discountAmount = baseAmount;
        discountRate = TRUE;
// In this procedure, the previous calls added up to over 60 minutes and this was
// to a MCI customer.
// Since the base amount was already determined, then charge the customer
// for half of this.
    PROCEDURE friendsAndFamilyEndOfMonth9
        discountAmount = round(baseAmount * 50%), 2);;
        discountedRate = TRUE;
```

An assumption of the exemplary usage procedures set-forth above is that there are two passes through the rating engine 30; once when a usage event is initially rated and once when discounting needs to be applied. For example, the rating engine 30 could receive an aggregate of certain types of usage events at the end of the month to determine whether discounting applies via, for example, service agent 1005 illustrated in FIG. 1 which could initiate a service request to the event manager 80 at a predetermined date, e.g., the 15 th of each month, which would cause the event manager 80 to implement a workplan generated by the workplan manager 75.

An assumption is made in this example that if less than an hour of calls are made in a month by a residential customer, normal rates apply. The first 60 minutes of calls for a residential customer is free if more than an hour of calls are made in the month, the customer is charged $10 for the hour of calls and the customer receives a 50% discount when calling other customers of the long distance provider. If a call crosses the boundary of the free 60 minutes, then the remaining portion of the call is charged during the time period in which it occurred.

Now particular usage events will be run through the rating system according to the present invention using the values set forth in this example. Assume a commercial long distance telephone call was made. A switch of the long distance service provider's network would generate a call detail record for the call (e.g., network element 90 shown in FIG. 1) and the mediator 120 would poll the network element 90 and translate the data block for the call detail record to build the message for the usage event to be rated according to an embodiment of the present invention. The identity of the switch identifies the identity of the service provider. The service provider identity plus the call type (e.g., contained in the call detail record) determines the event type (e.g., measured service, WATS, 800) which identifies the workplan to be generated by the workplan manager 75. The mediator 120 then provides the message to the queue manager 70 which provides the message to the event manager 80.

At this point, the message formed by the mediator 120 would include, for example, tag values for the calling party, the called party, the duration of the call, the time of the call and the billing telephone number. The event manager 80 utilizes, for example, the event type header of the message (e.g., measured service, WATS, 800) to determine a workflow via sending a message to the workplan manager 75 which generates the workplan and provides it to the event manager 80 via the queue manager 70. The event manager 80 then implements the workplan and a task of the workplan will include rating the usage event by the rating engine 30. Thus, the event manager 80 sends the usage event message to the rating engine 30 and the usage event message arrives with the following input variables shown in Table 9.

| Variable | Value |
| --- | --- |
| accountType | 'commercial' |
| adjustedTime | 1996-12-31 12:00:00:00 |
| duration | 00000:00:32:36.000 |
| endOfMonthDiscount | FALSE |
| rateGroup | RM125_292 |
| rateProvider | 'MCI' |
| testState [NOT NECESSARY?] | FALSE |
| usageEventDateTime | 1996-12-31 12:00:00:0000 |
| usageType | 'LongDistance' |

Processing of the usage event by the rating engine 30 will produce the following usage event output variables: amount; and usageTypeProcedureInvoked as provided by the procedure executed by the rating engine 30.

The rating engine 30 will have already downloaded the rating rules for the usage event and service provider from the rating database 10 and thus the loaded rating rules stored in memory 301 will be executed by the CPU 300 to process the usage event. Included in the downloaded rating rules will be the decision tree for a long distance MCI telephone call as illustrated in FIG. 17. Accordingly, the rating engine 30 will now go through the decision tree illustrated in FIG. 17. Since the accountType of the usage event listed in Table 9 (and included as a tag of the usage event message read by the rating engine 30) is 'commercial' and endOfMonthDiscount is FALSE, then the procedure commercialRate will be executed, as shown in the decision tree of FIG. 17. The rating engine 30 utilizes the tag values of the message for the time period groups involved in the rating of the call, which in this case is Peak based upon an adjusted time of 1996-12-31 12:00:00 (as indicated in Table 5) and a duration of 32:36. The rating engine 30 then determines the base rate based upon a time period group of Peak, a rate group of RM125_292 and an account type of 'commercial.' As shown in Table 6, the base rate contains the information of 0.3087 for the first minute and 0.3191 for each minute thereafter. Thus, the amount charged is $10.5199 (note that the rate table rounded up 32:36 minutes to 33 minutes which results in $10.5199=0.3087+(32*0.3191)). The final amount due is rounded to two decimal places to result in $10.52. The output variables determined by the rating engine 30 are the added to tag values of the message for the usage event with their values as shown in Table 10.

TABLE 10

| Variable | Value |
|---|---|
| amount | 10.52 |
| usageTypeProcedureInvoked | commercialRate |

In another example, assume a residential long distance telephone call was made and processed in a similar manner to that described above (e.g., polling of network element 90 to retrieve call detail record, formation of event usage message by mediator 120 and implementation of workplan including rating of the usage event). Thus, the usage event message is sent to the rating engine 30 and comes with the following input variables as shown in Table 11 and results in the usage event output variables baseAmount and usageTypeProcedureInvoked as defined by the procedure executed by the rating engine 30.

TABLE 11

| Variable | Value |
|---|---|
| accountType | 'residential' |
| adjustedTime | 1996-12-31 16:00:00:00 |
| duration | 00000:01:32:36:000 |
| endOfMonthDiscount | FALSE |
| ocp | 'friendsAndFamily' |
| rateGroup | RM125_292 |
| rateProvider | 'MCI' |
| testState | FALSE |
| usageEventDateTime | 1996-12-31 16:00:00:0000 |
| usageType | 'LongDistance' |

As with the previous example, the rating engine 30 will have already loaded the appropriate rating rules for theusage event (e.g., long distance MCI) and the decision tree illustrated in FIG. 17 will be evaluated. Since the acountType is 'residential', the endOfMonthDiscount if FALSE and the optional calling plan (ocp) is 'friendsAnd Family', then the procedure friendsAndFamilyRate will be executed, as shown in FIG. 17. Utilizing the appropriate tags of the usage event message, the rating engine 30 determines the time period groups, which in this case is Day and Evening (e.g., as shown in Table 4 above) based upon an adjusted time of 1996-12-31 16:00:00 (e.g., an input tag of the message) and a duration of 01:32:36 (e.g., another input tag of the message) . The rating engine 30 then determines the base rate based upon a time period group of Day and Evening, a rate group of RM125_292 and an account type of 'residential'. As shown in Table 6, the base rate contains a flat rate of 0.2799 for each minute for Day and a flat rate of 0.1599 per minute for Evening. The amount charged is thus $22.0701 (note that the rate table rounds up 01:32:36 to 93 minutes, resulting in (60*0.2799)+(33*0.1599)=22.0707). The amount determined is then rounded to two decimal places resulting in $22.07. The output variables determined by the rating engine 30 are then appended as output tags to the usage event with their values as shown in Table 12.

TABLE 12

| Variable | Value |
|---|---|
| baseAmount | 22.07 |
| usageTypeProcedureInvoked | friendsAndFamilyRate |

In another example, assume that the end of month discounting is being calculated. For example, the discounting service agent 1005 could initiate this process by sending a service request to the event manager 80 which would implement a workplan for a MCI long distance usage event (as indicated in the input tags of the usage event message sent to the event manager 80). Accordingly, the rating engine 30 would be a task of the discounting workplan and the input tags of the message sent to the rating engine would include the following input values as listed in Table 13.

TABLE 13

| Variable | Value |
|---|---|
| accountType | 'residential' |
| adjustedTime | 1996-12-31 17:00:00.000 |
| calledPartyMCICustomer | FALSE |
| baseAmount | 27.08 |
| calledMCIParty | FALSE |
| duration | 00000:01:32:36 |
| endOfMonthDiscount | TRUE |
| monthDuration | 10:00:01 |
| ocp | 'friendsAndFamily' |
| previousCallsDuration | 00000:00:00 000 |
| rateGroup | RM125_292 |
| rateProvider | 'MCI' |
| testState | FALSE |
| usageEventDateTime | 1996-12-31 17:00:00:000 |
| usageType | 'LongDistance' |

The following usage event output variables will be produced based on this usage event via the procedure executed by the rating engine 30 to rate the usage event: discountAmount; discountRate; and usageTypeProcedurelnvoked. After receiving the usage event message from the event manager 80, the rating engine 30 goes through the decision tree illustrated in FIG. 17 and since, as shown in Table 13, accountType is residential, endOfMonthDiscount is TRUE, monthDuration is greater than 60 minutes and callPartyMCICustomer is FALSE, then the procedure friendsAndFamilyEndOfMonth3 will be executed, also as indicated in FIG. 17. Utilizing the input tags of the of the usage event message illustrated in FIG. 12, the rating engine 30 then determines the time period groups involved in the rating, which in this case is Evening (as shown in Table 4) based upon an adjusted time of 1996-12-31 17:00:00 and a duration of 01:32:36. The rating engine 30 then determines the base rate based upon a time group period of Evening, a rate group of RM125_292 and an account type of 'residential'. As shown in Table 6, the base rate contains a flat rate of 0.1599 for each minute resulting in an amount charged of $5.2767 (e.g., the rate table rounds 01:32:36 to 93 minutes, the first 60 minutes are free (subject to the $10.00 charge) which leads to 33 minutes at 0.1599 per minute resulting in $5.2767). The amount determined is $10.00 plus the amount charged of 5.2767 rounded to two decimal places resulting in $15.28. The output variables are then appended as output tags to the usage event message with their respective values as shown in Table 14.

TABLE 14

| Variable | Value |
| --- | --- |
| discountAmount | 15.28 |
| discountRate | TRUE |
| usageTypeProcedureInvoked | friendsAndFamilyEndOfMonth3 |

As will be appreciated by those skilled in the art, while the examples provided to illustrate exemplary operation of a rating engine according to the present invention relate to telephony, the rating engine apparatus and method according to the present invention can operate upon any type of chargeable item, such as cable services or utility services, via a rating database containing the appropriate rating rules and decision trees including the procedure needed to evaluate the particular type of usage event.

What is claimed is:

1. An event rating engine, comprising:
   a processor;
   a memory coupled to the processor, an executable file being stored in the memory and executable by the processor, the executable file representing a predetermined set of rating rules stored in a rating database; and
   an I/O device coupled to the processor;
   wherein the processor, in response to a signal from the I/O device indicating a usage event to be processed, executes the executable file stored in the memory to process the usage event, the processor and memory being logically decoupled from the rating database when the usage event is processed.

2. The event rating engine according to claim 1, further comprising a rating domain server coupled to the processor.

3. The event rating engine according to claim 2, wherein the rating database is coupled to the rating domain server.

4. The event rating engine according to claim 2, further comprising a rating editor coupled to the rating domain server.

5. The event rating engine according to claim 1, further comprising a rating supervisor coupled to the processor.

6. The event rating engine according to claim 1, further comprising a queue manager coupled to the processor via the I/O device.

7. The event rating engine according to claim 6, further comprising at least one network element coupled to the queue manager.

8. The event rating engine according to claim 6, further comprising an event manager coupled to the queue manager.

9. The event rating engine according to claim 8, further comprising an event repository coupled to the event manager.

10. The event rating engine according to claim 6, further comprising at least one service agent coupled to the queue manager.

11. The event rating engine according to claim 10, further comprising a customer database coupled to the at least one service agent.

12. The event rating engine according to claim 5, further comprising a rating monitor coupled to the rating supervisor.

13. The event rating engine according to claim 7, wherein the at least one network element is coupled to the queue manager via a mediator.

14. The event rating engine according to claim 1, wherein the usage event includes one of a telephony event, a cable service event and a utility event.

15. A method for rating a usage event, comprising the steps of:
   downloading a predetermined set of rating rules as an executable file to a storage device, the predetermined set of rating rules being stored in a rating database;
   receiving a usage event;
   executing, in a processor coupled to the storage device, the executable file to determine a procedure associated with the usage event and perform the procedure on the usage event; and
   outputting a result of the processed usage event;
   wherein the step of executing the executable file occurs when the rating database is logically decoupled from the processor and the storage device.

16. A method according to claim 15, wherein the step of executing the executable file to determine a procedure further includes the steps of;
   defining a decision tree, the decision tree having at least one discrete decision branch and at least one scalar branch; and
   evaluating a discrete decision branch and a scalar decision branch to determine the procedure.

17. An event rating engine, comprising:
   a processor;
   a memory coupled to the processor, an executable file being stored in the memory and executable by the processor, the executable file representing a predetermined set of rating rules stored in a rating database;
   an I/O device coupled to the processor, wherein the processor, in response to a signal from the I/O device indicating a usage event to be processed, executes the executable file stored in the memory to process the usage event, the processor and memory being logically decoupled from the rating database when the usage event is processed;
   a rating supervisor coupled to the processor; and
   a rating monitor coupled to the rating supervisor.

* * * * *